United States Patent
Benson

(10) Patent No.: US 11,961,216 B2
(45) Date of Patent: Apr. 16, 2024

(54) PHOTOGRAPHY SESSION ASSISTANT

(71) Applicant: Shutterfly, LLC, Roseville, MN (US)

(72) Inventor: Keith Benson, Eden Prairie, MN (US)

(73) Assignee: Shutterfly, LLC, San Jose, CA (US)

( * ) Notice: Subject to any disclaimer, the term of this patent is extended or adjusted under 35 U.S.C. 154(b) by 0 days.

(21) Appl. No.: 17/171,914

(22) Filed: Feb. 9, 2021

(65) Prior Publication Data

US 2021/0241444 A1 Aug. 5, 2021

Related U.S. Application Data

(63) Continuation-in-part of application No. 17/070,729, filed on Oct. 14, 2020, which is a continuation of application No. 16/386,918, filed on Apr. 17, 2019, now Pat. No. 10,839,502.

(51) Int. Cl.

| | |
|---|---|
| H04N 5/28 | (2006.01) |
| G06F 3/0482 | (2013.01) |
| G06T 7/00 | (2017.01) |
| G06V 40/10 | (2022.01) |
| G06V 40/16 | (2022.01) |
| H04N 5/222 | (2006.01) |

(52) U.S. Cl.
CPC .......... *G06T 7/0002* (2013.01); *G06F 3/0482* (2013.01); *G06V 40/103* (2022.01); *G06V 40/175* (2022.01); *H04N 5/222* (2013.01); *G06T 2207/30168* (2013.01); *G06T 2207/30201* (2013.01)

(58) Field of Classification Search
CPC ......... G06T 7/0002; G06T 2207/30168; G06T 2207/30201; G06F 3/0482; G06F 3/04842; G06F 3/04845; G06F 3/04847; G06F 3/0488; G06V 40/103; G06V 40/175; G06V 40/174; H04N 5/222; H04N 5/2628; H04N 5/28
See application file for complete search history.

(56) References Cited

U.S. PATENT DOCUMENTS

| | | | |
|---|---|---|---|
| 6,606,117 B1 | 8/2003 | Windle | |
| 8,292,431 B2 * | 10/2012 | Uchida | .................... A61B 3/12 351/246 |
| 8,320,641 B2 | 11/2012 | Steinberg et al. | |
| 8,340,452 B2 | 12/2012 | Marchesotti | |
| 8,537,230 B2 | 9/2013 | Tsuji | |
| 8,917,326 B2 | 12/2014 | Gotoh | |
| 9,008,436 B2 | 4/2015 | Ptucha | |

(Continued)

*Primary Examiner* — Hien L Duong
(74) *Attorney, Agent, or Firm* — Merchant & Gould P.C.

(57) ABSTRACT

Devices and methods for conducting a remote photography session are described. In some instances, a computing device at a photography station receives messages from a photography station controller which is remote from the photography station. In some examples, the computing device receives one or more messages instructing the computing device to capture an image from an image capture device. The computing device can also receive one or more messages instructing the computing device to adjust the image capture device. Additionally, the messages may instruct the computing device to present instructions to a subject of the photography session. These instructions can prompt the subject to make adjustments to meet a criteria for a photograph in the photography session.

20 Claims, 27 Drawing Sheets

(56) References Cited

U.S. PATENT DOCUMENTS

| | | | |
|---|---|---|---|
| 9,015,579 B2 * | 4/2015 | Jin | G06T 11/60 |
| | | | 715/243 |
| 9,106,821 B1 | 8/2015 | Baldwin | |
| 9,552,374 B2 | 1/2017 | Ptucha et al. | |
| 9,866,748 B2 | 1/2018 | Sivan | |
| 10,062,173 B1 | 8/2018 | Padfield | |
| 10,091,414 B2 | 10/2018 | Chan | |
| 10,136,052 B2 | 11/2018 | Garca Morate et al. | |
| 10,264,177 B2 * | 4/2019 | Chan | H04N 1/00183 |
| 10,348,948 B2 * | 7/2019 | Baym | H04N 5/44 |
| 10,477,184 B2 | 11/2019 | Surma et al. | |
| 10,679,041 B2 | 6/2020 | Cyrus | |
| 10,839,502 B2 | 11/2020 | Cyrus | |
| 11,123,041 B2 * | 9/2021 | Ryu | A61B 8/5223 |
| 2006/0064635 A1 * | 3/2006 | Reid | G06T 11/60 |
| | | | 715/205 |
| 2006/0147107 A1 | 7/2006 | Zhang et al. | |
| 2008/0136919 A1 | 6/2008 | Tsuji | |
| 2009/0231457 A1 | 9/2009 | Lee et al. | |
| 2009/0232409 A1 | 9/2009 | Marchesotti | |
| 2011/0029562 A1 | 2/2011 | Whitby et al. | |
| 2011/0157221 A1 | 6/2011 | Ptucha | |
| 2012/0106848 A1 | 5/2012 | Greig et al. | |
| 2013/0108171 A1 | 5/2013 | Ptucha | |
| 2013/0242036 A1 * | 9/2013 | Gorzynski | H04N 5/23238 |
| | | | 348/14.09 |
| 2014/0089816 A1 | 3/2014 | DiPersia et al. | |
| 2015/0235306 A1 | 8/2015 | Sabella | |
| 2015/0244794 A1 | 8/2015 | Poletto et al. | |
| 2016/0050363 A1 | 2/2016 | Stubler et al. | |
| 2017/0034409 A1 | 2/2017 | Chen et al. | |
| 2017/0105701 A1 * | 4/2017 | Pelissier | A61B 8/565 |
| 2017/0244909 A1 * | 8/2017 | Dannen | H04N 5/28 |
| 2017/0374280 A1 | 12/2017 | Chan et al. | |
| 2018/0096497 A1 | 4/2018 | Bennett | |
| 2018/0316854 A1 * | 11/2018 | Chan | H04N 23/63 |
| 2018/0374068 A1 * | 12/2018 | Molé | G07F 17/24 |
| 2019/0175011 A1 * | 6/2019 | Jensen | G06T 7/70 |
| 2019/0250601 A1 * | 8/2019 | Donahoe | G06F 3/0488 |
| 2019/0253614 A1 | 8/2019 | Oleson | |
| 2019/0294878 A1 | 9/2019 | Endras et al. | |
| 2019/0313020 A1 * | 10/2019 | Snyder | H04N 5/23296 |
| 2020/0111166 A1 * | 4/2020 | Kuruvilla | G06F 16/5838 |
| 2020/0111167 A1 * | 4/2020 | Kuruvilla | H04L 51/02 |
| 2020/0111201 A1 * | 4/2020 | Kuruvilla | G06T 7/0002 |
| 2021/0027451 A1 | 1/2021 | Cyrus | |
| 2021/0056655 A1 * | 2/2021 | Norimatsu | G06V 40/1365 |

* cited by examiner

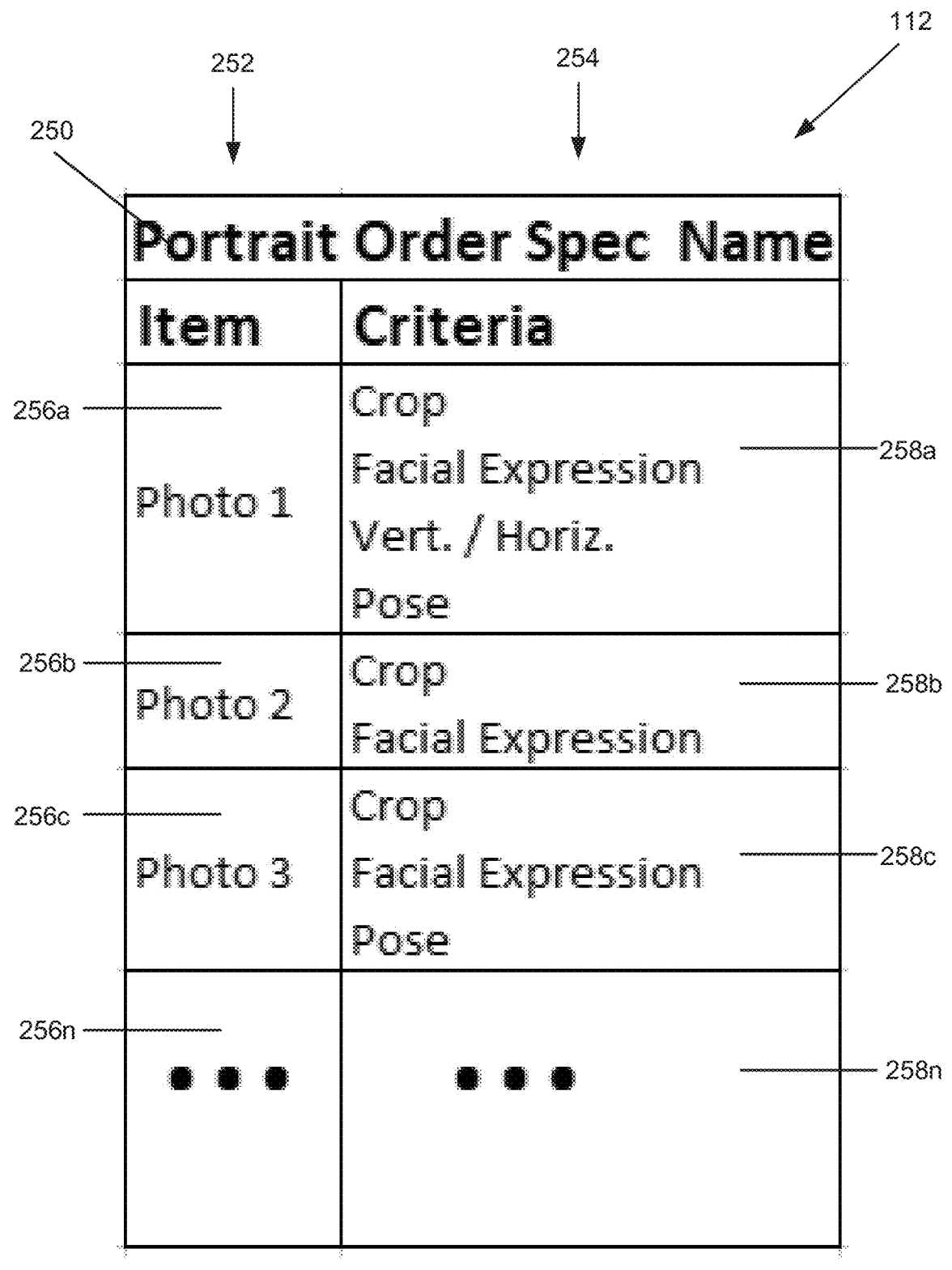

| Portrait Order Spec Name | |
|---|---|
| Item | Criteria |
| Photo 1 | Crop<br>Facial Expression<br>Vert. / Horiz.<br>Pose |
| Photo 2 | Crop<br>Facial Expression |
| Photo 3 | Crop<br>Facial Expression<br>Pose |
| ••• | ••• |

*FIG. 5*

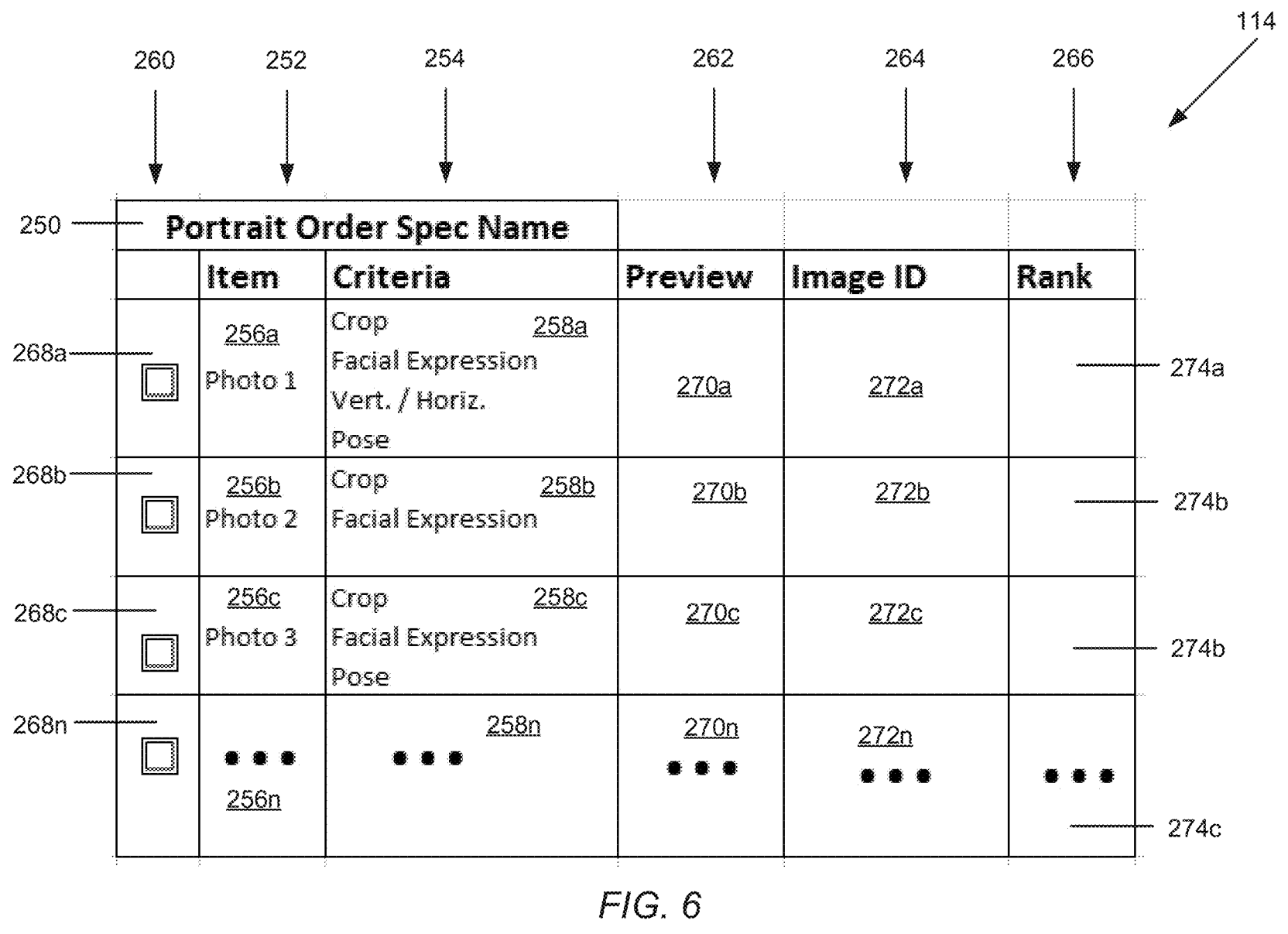

| Portrait Order Spec Name | | | | | |
|---|---|---|---|---|---|
| 260 | Item | Criteria | Preview | Image ID | Rank |
| ☐ 268a | 256a Photo 1 | Crop 258a<br>Facial Expression<br>Vert. / Horiz.<br>Pose | 270a | 272a | 274a |
| ☐ 268b | 256b Photo 2 | Crop 258b<br>Facial Expression | 270b | 272b | 274b |
| ☐ 268c | 256c Photo 3 | Crop 258c<br>Facial Expression<br>Pose | 270c | 272c | 274b |
| ☐ 268n | ⋮<br>256n | ⋮<br>258n | ⋮<br>270n | ⋮<br>272n | ⋮<br>274c |

*FIG. 6*

Modern Studio — 114

| Item | Criteria | Preview | Image ID | Rank |
|---|---|---|---|---|
| 256a Photo 1 | Half Length 258a<br>Soft Smile<br>Vertical<br>Arms Crossed | 270a | 272a | |
| 256b Photo 2 | Half Length 258b<br>No smile, happy | 270b | P20190305075236<br>P20190305082543<br>P20190305123226 272c | 1<br>2<br>3 |
| 256c Photo 3 | Close up 258c<br>Full Smile<br>Standing | 270c | P20190305103741 | 1 |
| 256n | 258n | 270n | 272n | ••• |

PHOTOGRAPHY SESSION ASSISTANT

CROSS REFERENCE TO RELATED APPLICATIONS

This application is a continuation-in-part of U.S. application Ser. No. 17/070,729, filed on Oct. 14, 2020, entitled PHOTOGRAPHY SESSION ASSISTANT, which is a continuation of U.S. patent application Ser. No. 16/386,918, filed on Apr. 17, 2019, issued as U.S. Pat. No. 10,839,502 on Nov. 17, 2020, entitled PHOTOGRAPHY SESSION ASSISTANT, the disclosures of which are hereby incorporated by reference in their entireties. To the extent appropriate a claim of priority is made to each of the above-identified applications.

BACKGROUND

Professional photography sessions can be performed at a professional studio, or on-site at churches, schools, etc. During a professional photography session, the photographer must manage the session in order to capture a set of images having certain requirements. The requirements can include different image cropping, facial expressions, poses, etc., to ensure that the session results in a set of images for the customer to choose from that fits the customer's desired order package. To make sure that the session results in an adequate set of images, photographers may manage the session to proceed in a specified order.

One difficulty is that, for a variety of reasons, photographers do not always follow the specified order. In addition, photographers are typically busy engaging the subject, and do not have time to carefully analyze and critique each image. Therefore, it is often difficult for the photographer to determine if a set of images taken during a photography session contains images that satisfy the requirements for all of the required photographs for the session while the session is still active and the subject, or subjects, are still present in order to capture more images if needed.

Another difficulty is that for each of the required photographs, multiple images are often taken. For example, for a particular required photograph (e.g. image cropping, pose, expression), multiple images may be taken for the photographer to determine the correct lighting and exposure settings, and also multiple images may be taken to ensure that the subject is not blinking, looking away, half-smiling, etc. As such, the set of images from the session may be quite large and include many images that do not satisfy the requirements. The large number of images can also get in the way of determining whether photographs that satisfy the requirements have been captured with the required level of quality to be considered for inclusion in an order package. In addition, the large number of images often makes it difficult and time consuming to choose the photographs to include in an order package from the set of images taken during the session.

If a session does not result in an adequate set of images to fulfill an order package at the end of a photography session, a new session, e.g. a make-up session, has to be scheduled. Scheduling a new, or make-up, session increases costs and the time burden on both the photographer and customer.

SUMMARY

In general terms, this disclosure is directed to conducting a remote photography session. In some embodiments, and by non-limiting example, a computing device at a photography station receives messages from a photography station controller to capture one or more photographs from an image capture device. Additionally, these messages can adjust the image capture device or present instructions to a subject of the photography session. In many embodiments, the photography station controller is remote from the photography station.

One aspect is a method of instructing and capturing at least one photograph during a remote photography session at a photography station is disclosed. The method comprising establishing a communication channel with a computing device of a remote photography station. Where the remote photography station further includes an image capture device. The method further comprising receiving live images of the remote photography station from the computing device, generating and sending at least one message to the computing device over the communication channel. The at least one message instructing the computing device to capture an image from the image capture device.

In another aspect a system for capturing at least one photograph during a remote photography session is disclosed. The system comprising a photography station controller including a first computing device and a photography station remote from the photography station controller. The photography station controller includes a second computing device and an image capture device. Where the first computing device includes a non-transitory storage medium and at least one processor. The non-transitory storage medium storing instructions that, when executed by the at least one processor, cause the first computing device to establish a communication channel with the second computing device, receive from the second computing device over the communication channel live images, and send at least one message to the second computing device over the communication channel. Where the at least one message instructs the second computing device to capture an image from the image capture device.

In a further aspect a non-transitory computer readable storage medium storing instructions for remotely conducting a photography session at a photography station is disclosed. When the instructions are executed by a processor, the instructions cause the processor to establish a communication channel with a computing device of the remote photography station. Where the remote photography station includes a camera. The instructions further cause the processor to receive live images of the remote photography station over the communication channel and send at least one message to the computing device over the communication channel. The at least one message instructs the computing device to capture an image from the image capture device.

BRIEF DESCRIPTION OF THE DRAWINGS

FIG. 5 is a schematic block diagram of an example photography portrait order specification.

FIG. 6 is a schematic block diagram of an example photography session status report.

FIG. 7 is a schematic block diagram of another example photography session status report.

DETAILED DESCRIPTION

Figure 1:
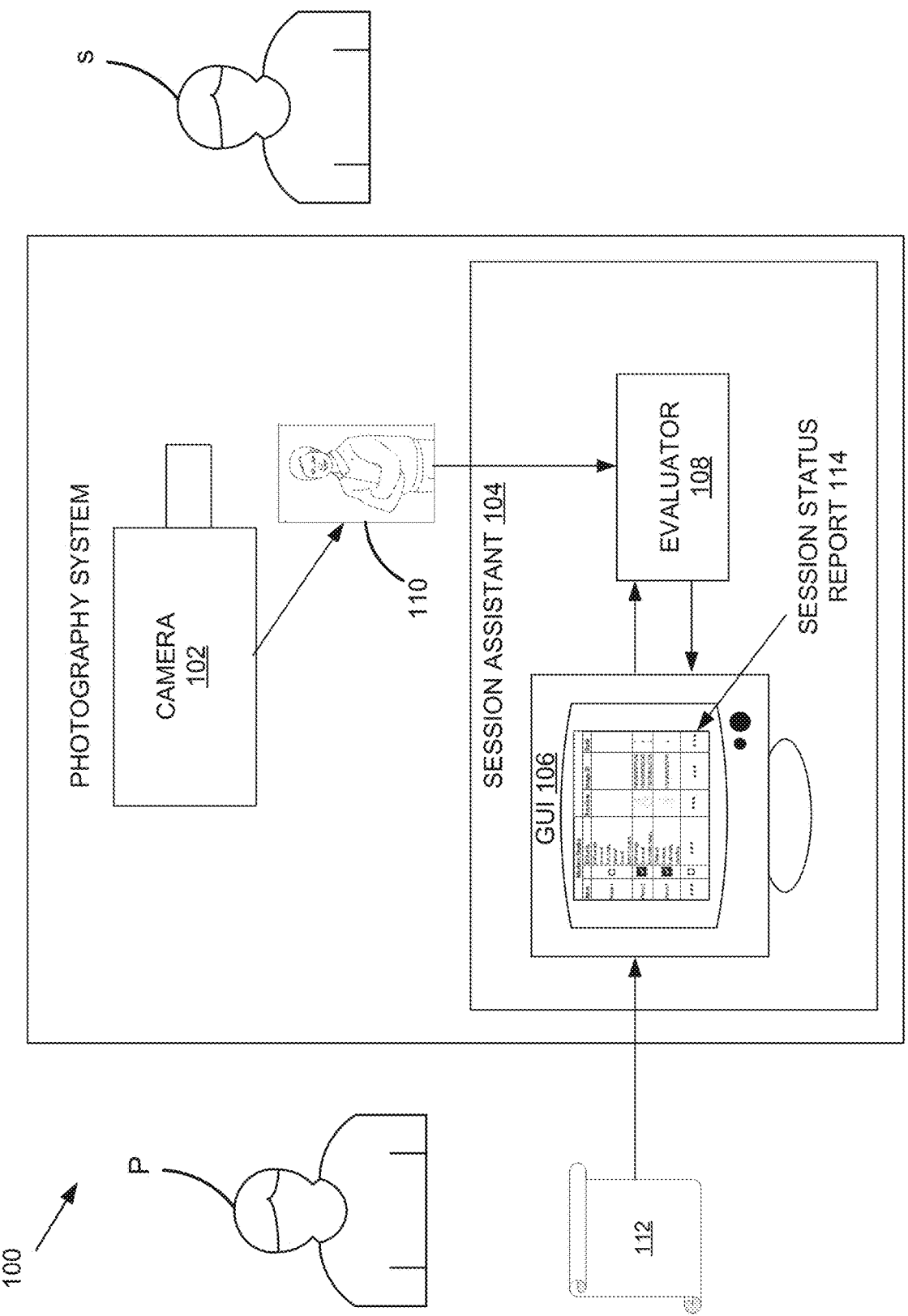
FIG. 1 is a schematic block diagram illustrating an example photography system including a session assistant.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating an example photography system 100. In this example, the photography system 100 includes a camera 102 and a session assistant 104. In the example shown, the session assistant 104 includes a graphical user-interface 106 and an evaluator 108. Also shown in FIG. 1 are a photographer P, a subject S, an image 110, a portrait order specification 112, and a session status report 114.

Figure 2:
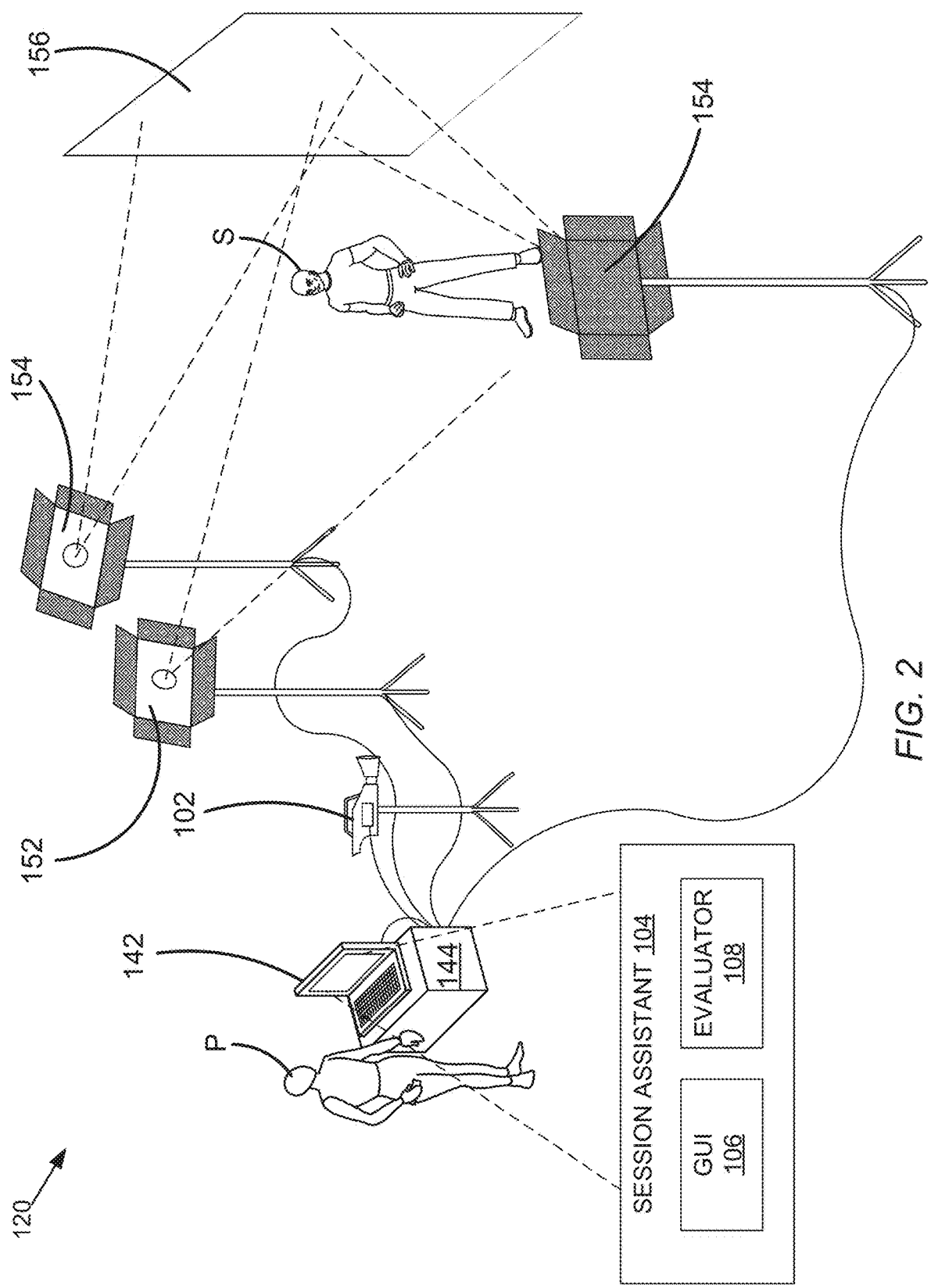
FIG. 2 is a schematic diagram of an example of a photography station.
Figure 3:
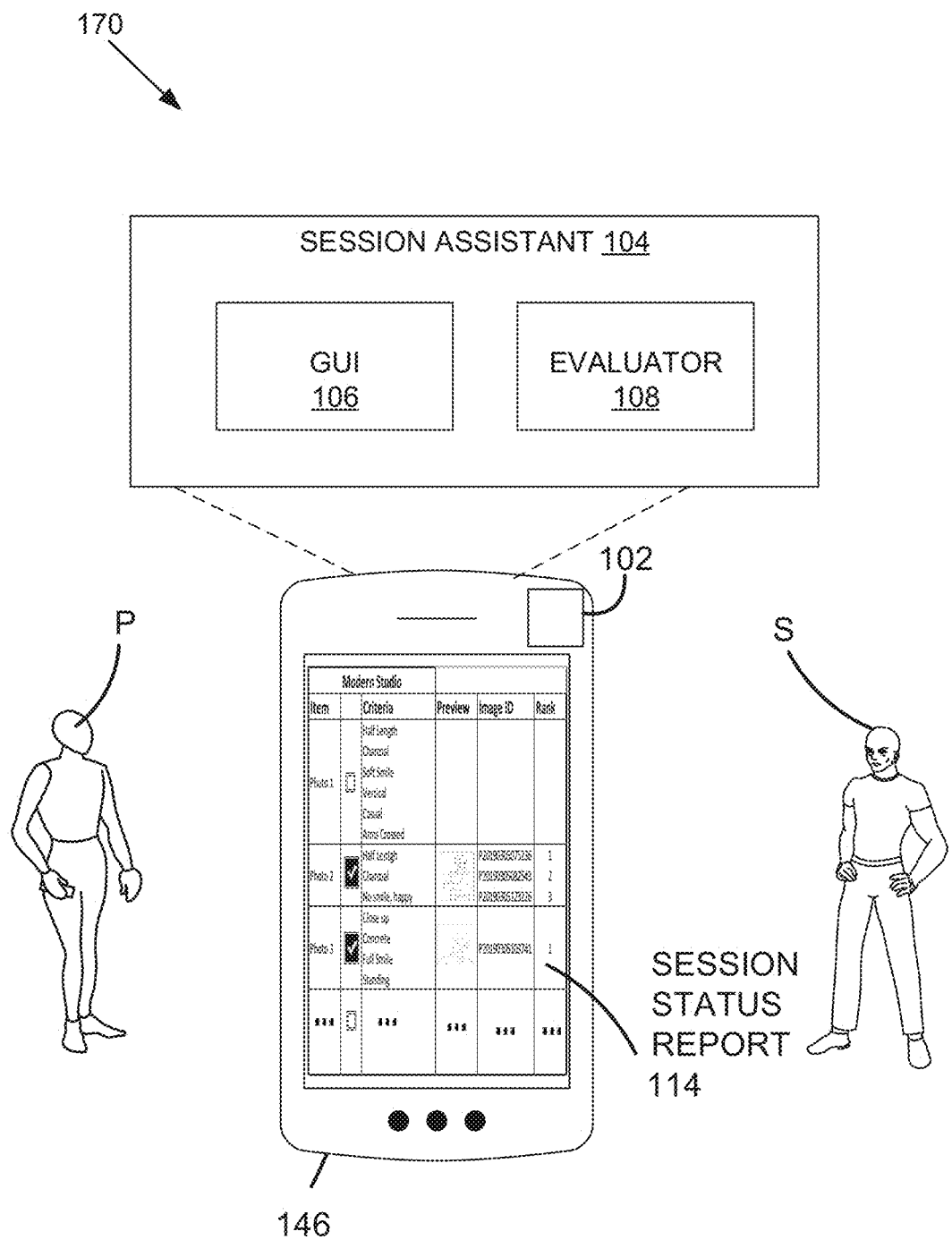
FIG. 3 is a schematic diagram of an example of a mobile photography system.

In some embodiments, the photography system 100 can be used by a photographer P during a photography session as a way to ensure that a portrait order specification 112 is completed. In some embodiments, a customer can choose a particular photography package that includes a set of photographs having certain criteria, such as certain poses, sizes, facial expressions, crop lengths, etc. In other embodiments the portrait order specification 112 can be chosen by any one or more of a photographer P, a subject S, a customer, or some other entity to identify a set of desired photographs to be captured during the photography session. In some embodiments, a chosen photography package can be associated with a portrait order specification 112 that contains data defining the criteria for the photographs in the photography package. In other embodiments, a photograph specification can be used in place of the portrait order specification 112. The photograph specification is the same as or similar to the portrait order specification 112 described herein, except that it is not necessarily associated with an order, such as a particular photography package or a set of photographs that have been ordered. Similar to the portrait order specification 112, however, the photography specification can include certain criteria for a set of photographs to be obtained, such as certain poses, sizes, facial expressions, crop lengths, etc. A photograph specification can also contain data defining the criteria for the set of photographs. In some embodiments, the photography system 100 is used in the context of a professional photography studio having a photography station, such as shown in FIG. 2. In other embodiments, the photography system 100 is used in the context of mobile photography, such as shown in FIG. 3.

The photography system 100 includes the camera 102 and the session assistant 104. The camera 102 captures the image 110 for evaluation by the session assistant 104. In some embodiments, the camera 102 is operated by a photographer P and captures images of a subject S. In other embodiments, the camera 102 can be operated by the subject S, such as with a remote control or using a timer, or by another individual, or the camera 102 can be programmed to operate automatically to capture the image 110. The camera 102 is typically a digital camera, although a film camera could also be used in another embodiment. If film cameras are used, the resulting prints are typically scanned by a scanner device into digital form for subsequent processing by the session assistant 104. The camera 102 can be a still or video camera. The resulting digital images 110 are at least temporarily stored in computer readable storage medium, which are then transferred to the session assistant 104. The transfer can occur across a data communication network (such as the Internet, a local area network, a cellular telephone network, or other data communication network), or can occur by physically transferring the computer readable storage medium containing the images (such as by personal delivery or mail) to the session assistant 104.

In some embodiments, the session assistant 104 operates to interact with the photographer via the graphical user-interface 106 for selecting the portrait order specification 112, evaluate the image 110 based at least in part on the portrait order specification 112, and indicate whether the image 110 satisfies the criteria of any of the required photographs in the portrait order specification 112. Examples of the session assistant 104 are illustrated and described in more detail herein with reference to FIG. 9.

The session assistant 104 generates a graphical user-interface (GUI) 106 for interacting with a photographer, or a user. The graphical user-interface 106 can receive input via the GUI, for example, the selection of the portrait order specification 112 from a database of portrait order specifications, and can display outputs, such as the session status report 114. Examples of the graphical user-interface 106 are illustrated and described in more detail herein with reference to FIG. 9, and examples of the session status report 114 are illustrated and described in more detail herein with reference to FIGS. 6-7.

In some embodiments, the evaluator 108 can determine if the image 110 satisfies the criteria for one of the required photographs in the portrait order specification 112. Examples of the evaluator 108 are illustrated and described in more detail herein with reference to FIG. 9.

The portrait order specification 112 can include a set of required photographs and a set of required criteria for each of the required photographs. Examples of the portrait order specification 112 are illustrated and described in more detail herein with reference to FIG. 5.

FIG. 2 is a schematic block diagram of an example of a photography station 120. The photography station 120 is an example of the photography system 100, shown in FIG. 1. In the example shown, the photography station 120 includes a camera 102, a computing device 142, a controller 144, foreground lights 152, background lights 154, and a background 156. In some embodiments, the photography station 120 further includes a handheld control (not shown) for use by a photographer P. The handheld control can include a capture button, for example, that is pressed by the photographer P to initiate the capture of an image of a subject S with the camera 102, and in some cases, the capture of an image is coordinated with flash lighting.

The photography station 120 operates to capture one or more images 110 of one or more subjects S, and can also operate to collect additional information about the subgroup, such as body position data. In some embodiments, the photography station 120 is controlled by a photographer P, who interacts with the subject S to guide the subject S to a good expression, pose, etc., for satisfying the criteria required in the portrait order specification 112. The photograph P can also indicate to the photography station 120 when an image 110 should be captured.

The camera 102 operates to capture digital images of the subject S. The camera 102 is typically a professional quality digital camera that captures high quality images.

In some embodiments, data from the camera 102 is supplied to a computing device 142. An example of a computing device is illustrated and described in more detail with reference to FIG. 4.

The computing device 142 can be directly or indirectly connected to the camera 102 to receive digital data. Direct connections include wired connections through one or more communication cables, and wireless communication using wireless communication devices (e.g., radio, infrared, etc.). Indirect connections include communication through one or more intermediary devices, such as a controller 144, other communication devices, other computing devices, a data communication network, and the like. Indirect connections include any communication link in which data can be communicated from one device to another device.

In some embodiments, the computing device 142 can include the session assistant 104. In such embodiments, the computing device 142 and camera 102 form the hardware implementation of the photography system 100. The computing device 142 can include a display which can display the graphical user-interface 106 GUI for the photography P to select the portrait order specification 112 for the photography session, and which can display the session status report 114 to update the photographer P regarding progress being made in completing the portrait order specification 112 during the photography session.

Some embodiments further include a controller 144. The controller 144 operates, for example, to synchronize operation of the camera 102 with the foreground lights 152 and the background lights 154. Synchronization can alternatively be performed by the computing device 142 in some embodiments.

Some embodiments further include a data input device, such as a barcode scanner, which can be integrated with the handheld control, or a separate device. The barcode scanner can be used to input data into the photography station 120. For example, a subject S can be provided with a card containing a barcode. The barcode is scanned by the data input device to retrieve barcode data. The barcode data includes, or is associated with, subject data, such as metadata 292 that identifies the subject S. The barcode data can also include or be associated with additional data, such as order data (e.g., a purchase order for products made from the images), group affiliation data (e.g., identifying the subject S as being affiliated with a school, church, business, club, sports team, etc.), or other helpful information. The computing device 142 can alternatively, or additionally, operate as the data input device in some embodiments. For example, a user such as the photographer P, may directly enter data via the keyboard, mouse, or touch sensor of the computing device 142, such as order data, group affiliation data, or data associated with the photography session, the portrait order specification 112, or data associated with an image 110. In some embodiments, a photographer can enter notes or other data regarding the required criteria that the particular image 110 is intended to capture such as pose, facial expression, crop length, included props, image orientation, etc.

In the example shown, the photography station 120 includes background lights 154. In some embodiments, a single background light 154 is included. The background lights can include one or more light sources, such as incandescent bulbs, fluorescent lamps, light-emitting diodes, discharge lamps, and the like. The background lights 154 are arranged and configured to illuminate the background 156. In some embodiments the background lights 154 are arranged at least partially forward of the background 156, to illuminate a forward facing surface of the background 156. In other embodiments, the background lights 154 are arranged at least partially behind the background, to illuminate a translucent background 156 from behind.

In some embodiments, the photography station 120 includes foreground lights 152. In some embodiments, a single foreground light 152 is included. The foreground lights 152 can include one or more light sources, such as incandescent bulbs, fluorescent lamps, light-emitting diodes, discharge lamps, and the like. The foreground lights 152 can include multiple lights, such as a main light and a fill light. Each of these lights can include one or more light sources.

The foreground lights 152 are arranged at least partially forward of the subject S to illuminate the subject S while an image 110 is being taken. Because a background 156 is typically positioned behind the subject S, the foreground lights 152 can also illuminate the background 156.

The photography station 120 can include a background 156. The background 156 is typically a sheet of one or more materials that is arranged behind a subject S while an image 110 of the subject S is captured. In some embodiments the background 156 is translucent, such that at least some of the light from the background light 154 is allowed to pass through. An example of a suitable material for the background 156 is a rear projection screen material. Other embodiments illuminate the background 156 from the front (but behind the subject S), such that background 156 need not be translucent. An example of a suitable material for the background 156, when front illumination is used, is a front projection screen material. In some embodiments, the background 156 is of a predetermined color and texture and specified in the portrait order specification 112 as part of the criteria for a set of required photographs.

FIG. 3 is a schematic diagram of an example of a mobile photography system 170. The mobile photography system 170 is another example of the photography system 100, shown in FIG. 1. In the example shown, the mobile photography system 170 includes a camera 102, and computing device 146, a session assistant 104 including a graphical user-interface 106 and evaluator 108, a session status report 114, a photographer P, and a subject S. The example in FIG. 3 also includes the session assistant 104, which includes the graphical user-interface 106 and the evaluator 108.

In the embodiment shown, the computing device 146 is a mobile device, such as a smartphone, and the camera 102 is a digital camera integrated with the computing device. In some embodiments, the subject S can also be the photographer P, for example, when taking a self-image, or "selfie."

In the embodiment shown, the computing device 146 includes the session assistant 104, which includes the graphical user-interface 106 and the evaluator 108. As such, by including both the camera 102 and the session assistant 104, the computing device 146 forms the hardware implementation of the photography system 100 in the example shown. The computing device 146 can include a display which can display the graphical user-interface 106 GUI for the photographer P to select the portrait order specification 112 for the photography session, and which can display the session status report 114 to update the photographer P regarding progress being made in completing the portrait order specification 112 during the photography session. An example of a computing device 146 is illustrated and described in more detail with reference to FIG. 4.

In some embodiments, the session assistant 104 can be implemented on separate hardware. For example, the session assistant 104 can be an application on the computing device 146 that is configured to display the GUI 106, receive a selection of the portrait order specification 112, and acquire the image 110, while the evaluator 108 can reside on a remote server. The image 110 and portrait order specification 112 can then be uploaded to the evaluator 108 on the remote server via a network, such as the Internet, which can then send results back to the computing device for display through the graphical user-interface 106.

Figure 4:
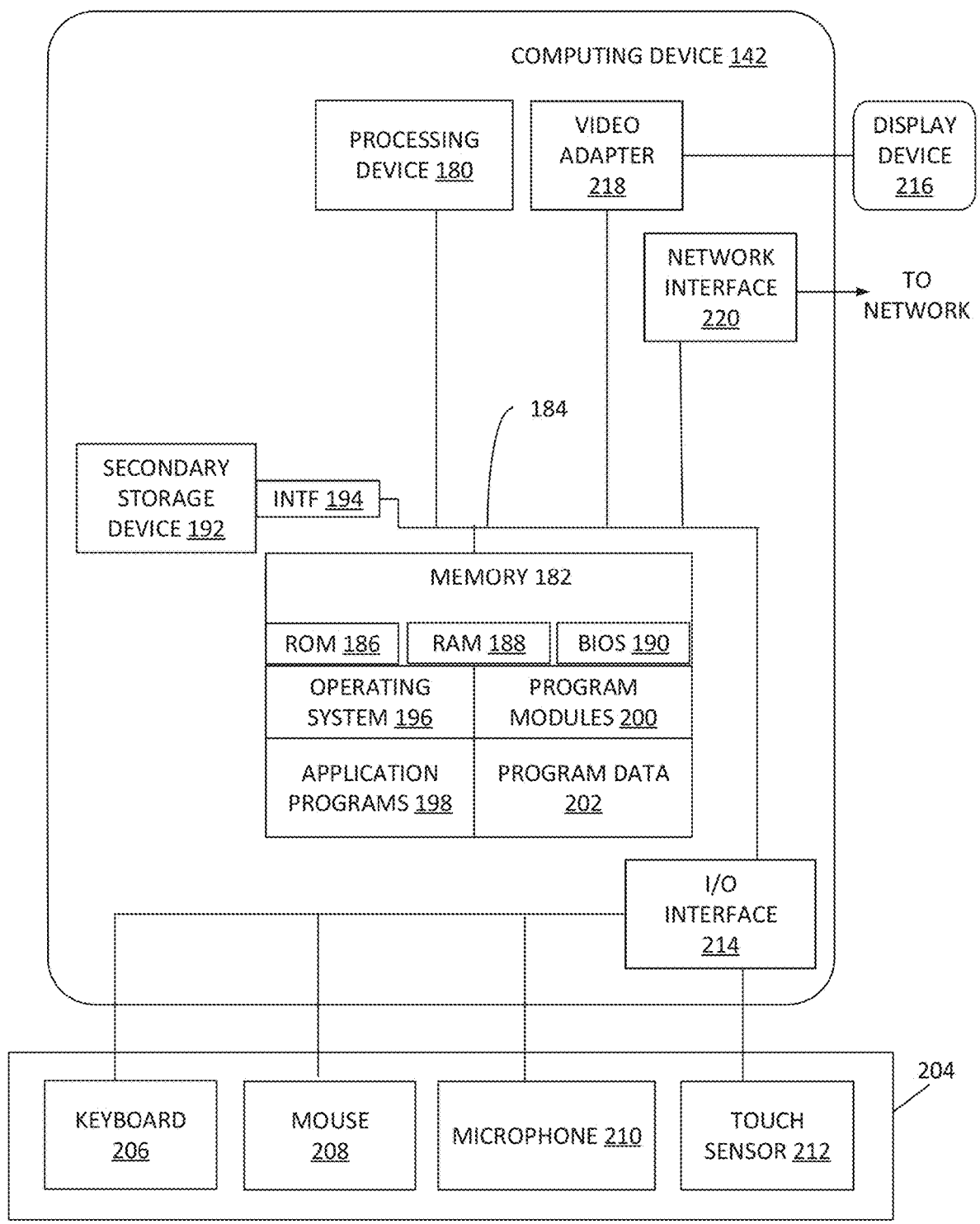
FIG. 4 illustrates an exemplary architecture of a computing device that can be used to implement aspects of the present disclosure, including any of the plurality of computing devices described herein.

FIG. 4 illustrates an exemplary architecture of a computing device that can be used to implement aspects of the present disclosure, including any of the plurality of computing devices described herein. The computing device illustrated in FIG. 4 can be used to execute the operating system, application programs, and software described herein. By way of example, the computing device will be described below as the computing device 142 of the photography station 120, shown in FIG. 2. To avoid undue repetition, this description of the computing device will not be separately repeated herein for each of the other computing devices, including the computing devices 142 and 146, but such devices can also be configured as illustrated and described with reference to FIG. 4.

The computing device 142 includes, in some embodiments, at least one processing device 180, such as a central processing unit (CPU). A variety of processing devices are available from a variety of manufacturers, for example, Intel or Advanced Micro Devices. In this example, the computing device 142 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 142 include a desktop computer, a laptop computer, a tablet computer, a mobile computing device (such as a smartphone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 142, such as during start up, is typically stored in the read only memory 186.

The computing device 142 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 142.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media, such as a non-transitory computer readable medium. Additionally, such computer readable storage media can include local storage or cloud-based storage.

A number of program modules can be stored in secondary storage device 192 or memory 182, including an operating system 196, one or more application programs 198, other program modules 200 (such as the software described herein), and program data 202. The computing device 142 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 142 through one or more input devices 204. Examples of input devices 204 include a keyboard 206, mouse 208, microphone 210, and touch sensor 212 (such as a touchpad or touch sensitive display). Other embodiments include other input devices 204. The input devices are often connected to the processing device 180 through an input/output interface 214 that is coupled to the system bus 184. These input devices 204 can be connected by any number of input/output interfaces, such as a parallel port, serial port, game port, or a universal serial bus. Wireless communication between input devices and the interface 214 is possible as well, and includes infrared, Bluetooth® wireless technology, 802.11a/b/g/n, cellular, or other radio frequency communication systems in some possible embodiments.

In this example embodiment, a display device 216, such as a monitor, liquid crystal display device, projector, or touch sensitive display device, is also connected to the system bus 184 via an interface, such as a video adapter 218. In addition to the display device 216, the computing device 142 can include various other peripheral devices (not shown), such as speakers or a printer.

When used in a local area networking environment or a wide area networking environment (such as the Internet), the computing device 142 is typically connected to the network through a network interface 220, such as an Ethernet interface. Other possible embodiments use other communication devices. For example, some embodiments of the computing device 142 include a modem for communicating across the network.

The computing device 142 typically includes at least some form of computer readable media. Computer readable media includes any available media that can be accessed by the computing device 142. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 142.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

FIG. 5 is a schematic block diagram of an example portrait order specification 112. In the example shown, the portrait order specification 112 is organized in a row-column spreadsheet format, and includes a portrait order specification name 250, a list 252 of required photographs 256, and a list 254 of required criteria 258. As shown, the list 252 includes required photographs 256*a-n*, where n can be the number of required photographs in the list 252. Also as shown, the list 254 includes required criteria 258*a-n*. In some embodiments, the portrait order specification 112 can be a data set organized in any suitable manner.

In some embodiments, the portrait order specification 112 has a unique identifier or portrait order specification name 250. A plurality of portrait order specifications 112 can be stored, such as in memory on a computing device 142, and each can have a unique identifier or portrait order specification name 250 to assist a photographer P in selecting a portrait order specification containing a desired set of required photographs 256.

As shown in the example, the required photographs 256 are associated with the required criteria 258. For example, the required photograph 256*a* is associated with the required criteria 258*a*, the required photograph 256*b* is associated with the required criteria 258*b*, and the required photograph 256*c* is associated with the required criteria 258*c*. In some embodiments, different required photographs 256 can be associated with required criteria 258 having different criteria, and differing numbers of criteria items. For example, FIG. 5 illustrates required photograph 256*a* associated with required criteria 258*a* which has four criteria items listed: crop, facial expression, vertical/horizontal image orientation, and pose. FIG. 5 illustrates required photograph 256*b* associated with required criteria 258*b* which has two criteria items listed: crop, and facial expression. FIG. 5 also illustrates required photograph 256*c* associated with required criteria 258*c* which has three criteria items listed: crop, facial expression, and pose. In some embodiments, the portrait order specification 112 may have fewer or more required photographs 256 than shown in FIG. 5, illustrated as required photograph 256*n*, and the associated required criteria 258 may have fewer or more required criteria items, and differing criteria items, than are shown in FIG. 5, as illustrated by required criteria 258*n*.

In some embodiments, the required criteria 258 associated with a required photograph 256 designate features that the required photograph includes. As such, the image 110 must include the features designated by the required criteria 258 in order for that image 110 to qualify as the required photograph 256. By way of example, in the portrait order specification 112 illustrated in FIG. 5, an image 110 taken during a photography session must include the designated crop (e.g. close up, full length, half length, etc.), and facial expression (e.g. full smile, soft smile, game face, etc.) as specified by the required criteria 258*b* in order for it to qualify as the required photograph 256*b* in the portrait order specification 112. In some embodiments, the evaluator 108 determines whether the image 110 includes such features. In some embodiments, the photographer P determines whether the image 110 includes such features. For example, the session assistant 104 can indicate to the photographer P whether the image 110 includes features associated with the required criteria 258 for at least one of the required photographs 256 in the portrait order specification 112 via a session status report 114 displayed in a graphical user-interface 106, and the photographer P determines whether the image 110 includes such features and can provide input, for example, by selecting that the image 110 satisfies the required criteria 258 for one more required photographs 256 via user input mechanisms of the graphical user-interface 106.

As described above with respect to FIG. 1, a photograph specification can alternatively be used in place of the portrait order specification 112 described herein. The photograph specification can contain, for example, data defining the criteria for a set of desired photographs. In some embodiments, a photograph specification specifies a group photo including a number of subjects at one or more scenes or locations, for example in a mobile photography context, as illustrated in FIG. 3. The photographer P may take a larger number of photos at each scene in a mobile photography session as compared to a photography session in a photography studio or at a photography station. For example, the lighting conditions in a mobile photography context may not be as well controlled as in a studio or station, and a large number of images may need to be taken to in order to satisfy the required criteria 258 of the photograph specification. In some embodiments, a photograph specification can be chosen by the photographer P, the subject or subjects S, or by some other user of the session assistant 104. In some embodiments, the photograph specification contains default required criteria 258, for example, a facial expression (e.g. smiling, eyes open and not blinking or winking, etc.), crop (e.g. close up, full length, half length, subject or subjects S located in a certain portion of the image, etc.), pose (e.g. sitting, standing, running, jumping, etc.), image quality (e.g. sharp and not blurry), etc. In other embodiments, the required criteria 258 for the set of required photographs are chosen by the photographer P, the subject or subjects S, or some other user of the session assistant 104. In still other embodiments, the photographer P, or subject S, or other user, can define new or additional required criteria 258.

Each of the components of the exemplary session status report will be discussed below with reference to both FIGS. 6-7 concurrently.

FIGS. 6-7 are schematic block diagrams of example photography session status reports 114. The examples shown in FIGS. 6-7 include session status report 114. The examples shown also includes a list 252 of required photographs 256, a list 254 of required criteria 258, a list 260 of indicators 268a-n, a list 262 of image previews 270a-n, a list 264 of image identifiers 272a-n, and a list 266 of image rankings 274a-n. The example shown in FIG. 6 illustrates a session status report 114 where no image 110 is associated with any required photograph 256, which can occur, for example, at the beginning of a photography session. The example shown in FIG. 7 illustrates a session status report 114 indicating several images 110 that are associated with at least one required photograph 256.

In the examples shown in FIG. 6, the session status report 114 is organized as a row-column spreadsheet for display, such as in the graphical user-interface 106. The session status report 114 can display the portrait order specification 112 data, e.g. the list 252 of required photographs 256 and the list 254 of required criteria 258 in analogous columns as that illustrated in FIG. 5. The session status report 114 can also display the portrait order specification name 250 of the selected portrait order specification 112.

In some embodiments, the list 260 of indicators 268a-n give visual feedback as to whether an image 110 that has been taken during a photography session satisfies the required criteria 258 and therefore qualifies as a required photograph 256. In the example shown in FIG. 7, the indicators 268a, n are blank checkboxes indicating that there is no image 110 that qualifies as required photographs 256a, n, and the indicators 268 b, c are checked checkboxes indicating that at least one image 110 qualifies as required photographs 256b, c. Other indicators can be used as indicators 268a-n, for example, color highlighting of a spreadsheet cell, text indicating yes or no, etc. In some embodiments, the indicators 268 can be configured to receive input, for example, a photographer P can click on, touch, or use other input mechanisms to activate a checkbox 268 such that it is checked or deactivate a checkbox 268 such that it is unchecked. In some embodiments, the presence of an image preview 270 or an image identifier 272 can give visual feedback as to whether an image 110 is associated with a required photograph 256, and the indicators 268 can receive input, e.g. from the photographer P, that an image 110 satisfies the required criteria 258 of a required photograph 256 and therefore qualifies as the required photograph 256. In other embodiments, the indicators 268 can be automatically activated, such as when an image 110 is automatically evaluated and determined to satisfy the required criteria 258 of a required photograph, for example by the evaluator 108.

In some embodiments, the list 262 of image previews 270a-n give visual feedback that an image 110 is associated with a required photograph 256. As shown in the example in FIG. 7, if there are more than one image 110 that are associated with a required photograph 256, the image preview 270 can be a thumbnail image representing one of the associated images 110. In some embodiments, an image 110 can be associated with more than one required photograph 256.

In some embodiments, the list 264 of image identifiers 272a-n includes unique identifiers for the images 110 that are associated with required photographs 256. In some examples, the unique identifier is the filename of the digital file in which the image 110 is stored, which can include a file path for determining the storage location of the digital file. In some embodiments, more than one image identifier can be displayed for more than one image 110 that is associated with a required photograph 256. In the example shown in FIG. 7, three images 110 are associated with the required photograph 256b, corresponding to three image identifiers 272b and the checkboxes 268b, and one image 110 is associated with the required photograph 256c, corresponding to one image identifier 272c and the checked checkbox 268c. FIG. 7 also shows that there are no images 110 as associated with the required photographs 256a, n, corresponding to the unchecked checkboxes 268a, n, no image previews 270a, n appearing in the list 262, and no image identifiers 272a, n appearing in the list 264.

In some embodiments, the list 266 includes image rankings 274a-n for the images 110 that qualify as required photographs 256. In some embodiments, an image 110 as associated with a required photograph 256 is only ranked against other images 110 as associated with the same required photograph 256. For example, as shown in FIG. 7, the three images 110 as associated with the required photograph 256b in the Modern Studio portrait order specification 112 include numeric rankings 274b of 1-3, in a top-to-bottom order, as displayed in the list 266 of the Modern Studio session status report 114. In the example shown, the 1-3 rankings are displayed at the same row height as the corresponding image identifiers 272b to indicate which image 110 corresponds to which ranking.

In some embodiments, the image rankings 274 are based on a required level of quality. In some embodiments, the required level of quality is determined by whether the image 110 includes features associated with certain required criteria items, e.g. the level of quality can be on a binary scale. For example, for a required photograph 256 requiring a portrait orientation, the level of quality for an image 110 that is a portrait image would be 100%, or 1, or "yes," etc., as to that orientation criteria, and an image 110 that is a landscape image would be 0%, or 0, or "no," etc., as to that orientation criteria. In some embodiments, the level of quality may be on a continuous scale, for example, for a required photograph 256 requiring a soft-smile facial expression, the level of quality can be categorized into appropriate categories depending on facial expression detection, or the level of quality can be numeric representing the closeness of the facial expression detected in the image 110 to a pre-determined, or expected, target soft-smile feature characteristics.

In some embodiments, a quality score for an image 110 can be determined based on an aggregation of levels of quality for all of the required criteria items associated with a required photograph 256. For example, for a required photograph 256 having required crop, facial expression, and pose criteria, the quality score of an image 110 including features associated with those required criteria can be determined by comparing, summing, or otherwise aggregating the levels of quality determined for each of the image 110, crop, facial expression, and pose included. In some embodiments, levels of quality for each individual required criteria item can be weighted such that the quality score is determined by a weighted aggregation.

Referring now to FIGS. 6-7 generally, in some embodiments, the session status report 114 can include fewer or more items. For example, in some embodiments, the session status report can display the quality score of the image 110 and the level of quality of the features within the image 110.

Figure 8:
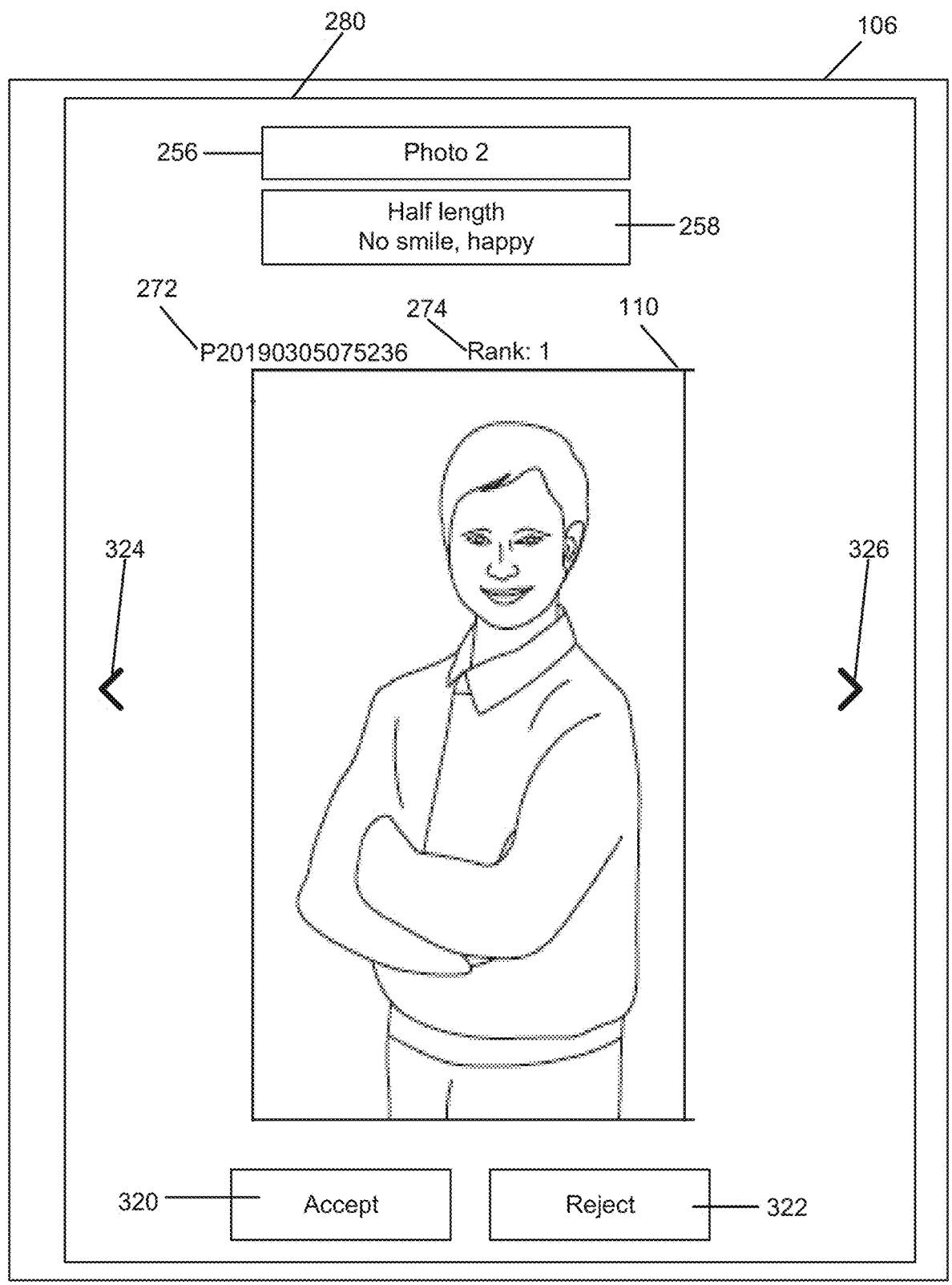
FIG. 8 is a schematic block diagram of a graphical user-interface screen for determining whether an image qualifies as a required photograph.

FIG. 8 is a schematic block diagram of a graphical user-interface 106 screen for determining whether an image 110 qualifies as a required photograph 256. The example shown in FIG. 8 includes accept button 320, reject button 322, left scroll button 324, and right scroll button 326. The example shown also includes the image 110, the required photograph 256 and associated required criteria 258, the image identifier 272 of the image 110, and the rank 274 of the image 110. In some embodiments, multiple photos that ranked the highest for a pose are displayed in one view to allow fast review and confirmation by the photographer. In other embodiments, multiple photos that ranked higher than a threshold ranking, or exceeded a threshold quality level or threshold quality score, for a pose, a crop, a facial expression, or other image feature or required criteria, are displayed in a single view to allow fast review and confirmation by the photographer.

In some embodiments, the session GUI display 280 of the graphical user-interface 106 can display the image 110 in a screen configured to receive inputs as to whether the image 110 satisfies the required criteria 258 for a required photograph 256, such as inputs from the photographer P. For example, an image 110 can be evaluated and associated with a required photograph 256 by the evaluator 108, and an image preview 270 and image identifier 272 for the image 110 can populate the session status report 114. In some embodiments, the session status report 114 can be configured to receive a selection of the image 110, for example by selecting the image preview 270 or image identifier 272, and the session assistant 104 can process the selection so as to display screen illustrated in FIG. 8 in the session GUI display 280, allowing a larger view of the image 110. In some embodiments, the session GUI display 280 is configured to receive input to digitally zoom and shift the image 110, thereby allowing a user, such as the photograph P, to further view the image 110 at the desired level of detail.

In some embodiments, the accept button 320 is configured to receive a selection, such as by the photographer P, that the image 110 satisfies the required criteria 258 for the required photograph 256, and the session assistant 104 can update the session status report 114 by activating the indicator 268 associated with the required photograph 256. In the example shown, if the photographer P selects the accept button 320, the image 110 (e.g. P20190305075236) is designated as qualifying as the required photograph 256b and the indicator 268b-1 can be checked, as illustrated in FIG. 7. It is noted that more than one image 110 can satisfy the required criteria 258 for one or more required photographs 256, and as such, more than one image 110 can be accepted via the accept button 320 and be designated as qualifying as a required photograph 256. In some embodiments, a selection of the accept button 320 can override a previous determination that the image 110 does not satisfy the required criteria 258.

In some embodiments, the reject button 322 is configured to receive a selection, such as by the photographer P, that the image 110 does not satisfy the required criteria 258 for the required photograph 256, and the session assistant 104 can update the session status report 114 by deactivating the indicator 268 associated with the required photograph 256. In some embodiments, a selection of the reject button 322 can override a previous determination that the image 110 satisfies the required criteria 258 and qualifies as the required photograph 256, thereby disqualifying the image 110 as the required photograph 256.

In some embodiments, a selection of the accept button 320 or the reject button 322 are equivalent to a user, such as the photograph P, checking or unchecking, respectively, the indicator 268 in the session status report 114.

In some embodiments, the left scroll button 324 and right scroll button 326 are configured to replace the image 110 and associated image identifier 272 and image rank 274 with a different image 110 and associated image identifier 272 and image rank 274. In some embodiments, all of the images 110 captured during a photography session can be retrieved by the session assistant 104 for display in the session GUI display 280 according to an order. A selection of the left and right scroll buttons 324 and 326 allow the user, such as the photograph P, to scroll through and view the images 110 from the photography session.

In some embodiments, the session GUI display 280 can be configured to receive a selection by the user, such as the photograph P, to change the association of the image 110 to a different photograph 256. For example, the photographer P can select the required photograph 256, e.g. Photo 2 as illustrated in FIG. 8, and the graphical user-interface can be configured to display a list of the required photographs 256 to the photographer P for selection by the photographer P as being associated with the image 110 being displayed, or the photographer P can select to remove any association of the image 110 with one or more required photographs 256. The session status report 114 can then be updated to add or remove the image 110 in the appropriate row according to the photographer's P selection.

Figure 9:
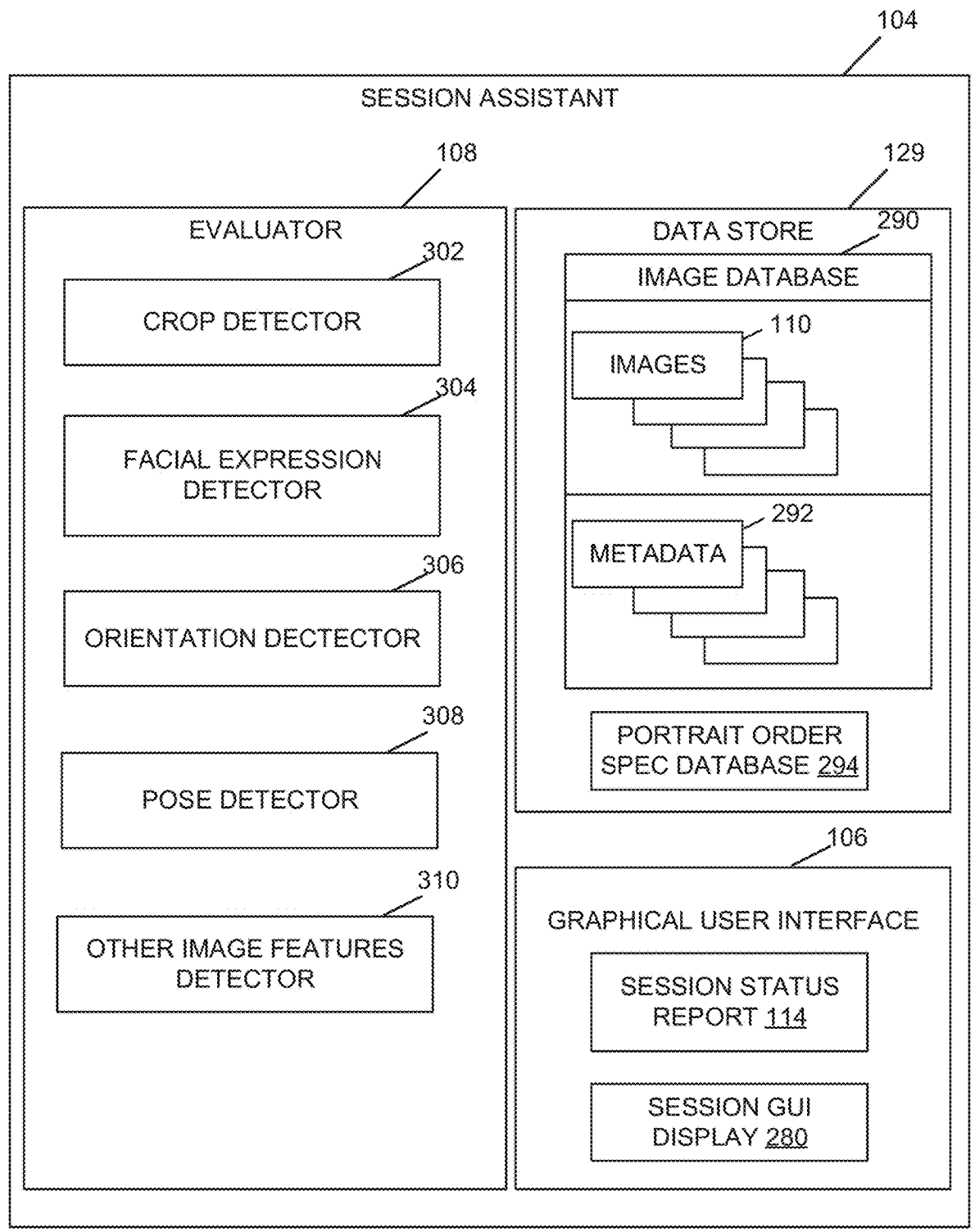
FIG. 9 is a schematic block diagram of a session assistant.

FIG. 9 is a schematic block diagram of a session assistant 104. In the example shown, the session assistant 104 includes a graphical user-interface 106, an evaluator 108, and a data store 129. Also as shown in the example, the data store 129 includes in image database 290 and a portrait order specification database 294.

As shown in the example, the graphical user-interface 106 includes the session status report 114 and the session GUI display 280. In some embodiments, the graphical user-interface 106 is configured to receive input from a user, such as a photographer P. The input can consist of a selection to display a list of portrait order specifications 112 in the session GUI display 280, and the input can also consist of a selection of one of the portrait order specifications 112 for use, either during a photography session or after a photography session as a check on whether the images 110 captured during a photography session completed the portrait order specification 112 by satisfying all of the required criteria 258 in the portrait order specification 112. The input may be received through session GUI display 280 via an input mechanism of a computing device, for example, a touch screen, keyboard, or mouse of computing device 142 or 146. The session assistant 104 can include or be in communication with the evaluator 108 and the data store 129 so as to send data from the data store, e.g. the image 110 from the image database 290 and the selected portrait order specification 112 from the portrait order specification database 294.

As shown in the example, the evaluator 108 includes a crop detector 302, a facial expression detector 304, an orientation detector 306, a pose detector 308, and an other image features detector 310. In some embodiments, the evaluator 108 is configured to receive images and data, such as the image 110 and data such as required criteria 258, determine whether an image 110 can be associated with a required photograph 256 by identifying and processing features included in the image 110. In some embodiments, the evaluator 108 can output whether the image 110 includes features associated with the required criteria 258 and associated the image 110 with one or more required photographs 256. In some embodiments, the evaluator 108 can determine the level of quality of the image 110 relative to the required criteria 258, rank the image 110 among multiple images 110 that associated with a particular required photograph 256, and determine a quality score of the image 110 as discussed above with respect to FIG. 7.

In some embodiments, the crop detector 302 is configured to determine the crop of the image 110. In some embodiments, crop, or alternatively referred to as crop length, (e.g. close up, full length, half-length, etc.), is the portion of the subject S that is visible in the image 110. The crop can be set by the field of the view of the camera 102, for example by setting the focal length of a telephoto zoom lens of the camera 102, or by physically moving the camera 102 closer or farther away from the subject S. The crop can also be set by selecting portions of a full resolution image and resizing those portions to the desired physical dimensions, e.g. digital zoom. In some embodiments, crop lengths can include extreme close up (zooming in to portions of the subjects head or face), close up (including the head of the subject S), head and shoulders, half-length (including the head of the subject S to the waist or belt line of the subject), three-quarter length (from the head of subject S to around the knees of the subject), and full length (from the head to the feed of the subject S). In the example shown in FIG. 11, the required photograph 256c illustrates an example head and shoulders crop, and the required photograph 256f illustrates an example three-quarter length crop.

In some embodiments, the crop detector 302 determines the crop by reading the crop from metadata of the image 110. For example, the camera 102 can include a telephoto zoom lens with electronics that can control autofocus, auto zoom, and auto aperture functionality to control image sharpness and resolution, magnification and field of view, and amount of light collected by the lens. Such a lens may also directly sense or control its focus, zoom (e.g. 18-55 mm, 75-300 mm, etc.), and aperture (F/2.8, F/4, F/16, etc.), or be in electronic communication with a camera body of camera 102 having electronics that control those lens parameters, or be in communication with a computing device 142 or 146, or a controller 144 that control focus, zoom, and aperture. In some embodiments, the lens settings (focus, zoom, aperture, etc.) when an image 110 is captured can be combined with the image 110 data in the image data file as metadata 292, and stored in the image database 290 in the data store 129.

In some embodiments, the crop detector 302 determines the crop of the image 110 by using image analysis, such as determining face points and body points of the subject S included in the image 110 via depth and position detection. The details regarding depth and position detection can be found in U.S. patent application Ser. No. 13/777,579 entitled "Photography System with Depth and Position Detection", which is hereby incorporated by reference.

In some embodiments, the facial expression detector 304 is configured to determine a facial expression of one or more subjects S included in the image 110. In some embodiments the facial expression detector 304 determines the facial expression of the subject or subjects S included in the image 110 by reading the facial expressions from metadata 292 of the image 110. For example, as described above in connection with FIG. 1, a photographer P may input data via the computing device 142. Such data may include notes regarding an image 110 being captured, such as the facial expression of the subject S during capture or the facial expression of subject S intended to be captured to satisfy required criteria 258. In some embodiments, input data may be associated with the image 110 and stored as metadata 292.

In some embodiments, the facial expression detector 304 determines the facial expression of the subject S included in the image 110 by using image analysis. As one example, facial expression detection can utilize the technology described in the commonly assigned U.S. patent application Ser. No. 16/012,989, filed on Jun. 20, 2018 by one of the present inventors, titled A HYBRID DEEP LEARNING METHOD FOR RECOGNIZING FACIAL EXPRESSIONS, the disclosure of which is hereby incorporated by reference in its entirety. In some embodiments, facial expressions can include full smile, half-smile, soft smile, no smile but happy, game face, looking away, blink, etc. In some embodiments, facial expression detection includes detecting whether the subject included in the image 110 is blinking, winking, has one or both eyes open or closed, or whether the subject is looking at the camera or looking away. In the example shown in FIG. 11, the required photograph 256a illustrates an example full smile, and the required photograph 256c illustrates an example soft smile.

In some embodiments, the orientation detector 306 is configured to determine the orientation of the subject or subjects S included in the image 110, e.g. horizontal or vertical, and the orientation of the image 110, e.g. portrait or landscape. In some embodiments, the orientation detector 306 is configured to determine orientations by reading the orientation data from metadata 292 of the image 110. In other embodiments, the orientation detector 306 is configured to determine orientations by using the EXIF camera data, or by using the width and height of the image 110.

In some embodiments, the orientation detector 306 is configured to determine the orientations by using image analysis, such as determining face points and body points of the subject S included in the image 110 via depth and position detection. The details regarding depth and position detection can be found in U.S. patent application Ser. No. 13/777,579 entitled "Photography System with Depth and Position Detection", which is previously incorporated by reference. In the example shown in FIG. 12, the required photograph 256a illustrates an example landscape photograph including a horizontal subject S, and the required photograph 256b illustrates an example portrait photograph including a vertical subject S.

In some embodiments, the pose detector 308 is configured to determine the pose, or poses, of one or more subjects S included in the image 110. In some embodiments, pose definition data can be compared with body point position data to determine the pose of a subject, or subjects, S. Pose definition data defines a set of poses by the relative positions of the subject's body parts to each other, e.g. pose definition data can include a set of standing poses and a set of sitting poses. The pose definition data differentiates between the standing and sitting poses by the positions of portions of the body. For example, a standing pose may be defined by the location of the hips being much higher than the location of the knees. Body point position data can be receive from a depth and position detection device, along with digital images including a skeletal model of the subject or subjects S, and depth images of the subject or subjects S. The body point and position data can include data that identifies the locations of subject body points within the digital image, and the skeletal model can be formed and visualized by lines extending between the body points and which provide rough approximations of the skeletal portions of the subject or subjects S. The details regarding pose detection can be found in U.S. patent application Ser. No. 13/777,579 entitled "Photography System with Depth and Position Detection", previously incorporated by reference.

In some embodiments, the other image features detector 310 is configured to determine other predefined or user-defined features included in the image 110. In some embodiments, user-defined features can be received via the session GUI display 280 and communicated to the evaluator 108 by the graphical user-interface 106. In some embodiments, the other image features or user-defined features may include hair styles, props, accessories, etc.

In some embodiments, the other image features detector 310 determines the other features by reading the other features data from metadata 292 of the image 110. In some embodiments, the other image features detector 310 determines the other features by using image analysis, such as object recognition, image processing, computer vision, machine learning, or any of those techniques in combination.

As shown in the example, the image database 290 stores the images 110 taken during the photography session and associated metadata 292. The portrait order specification database 294 can store a plurality of portrait order specifications 112.

In some embodiments, the metadata 292 can include subject S identifying data as well as image data such as date and time of capture, image filename and file type, and other image characteristics or image identifying data.

Figure 10:
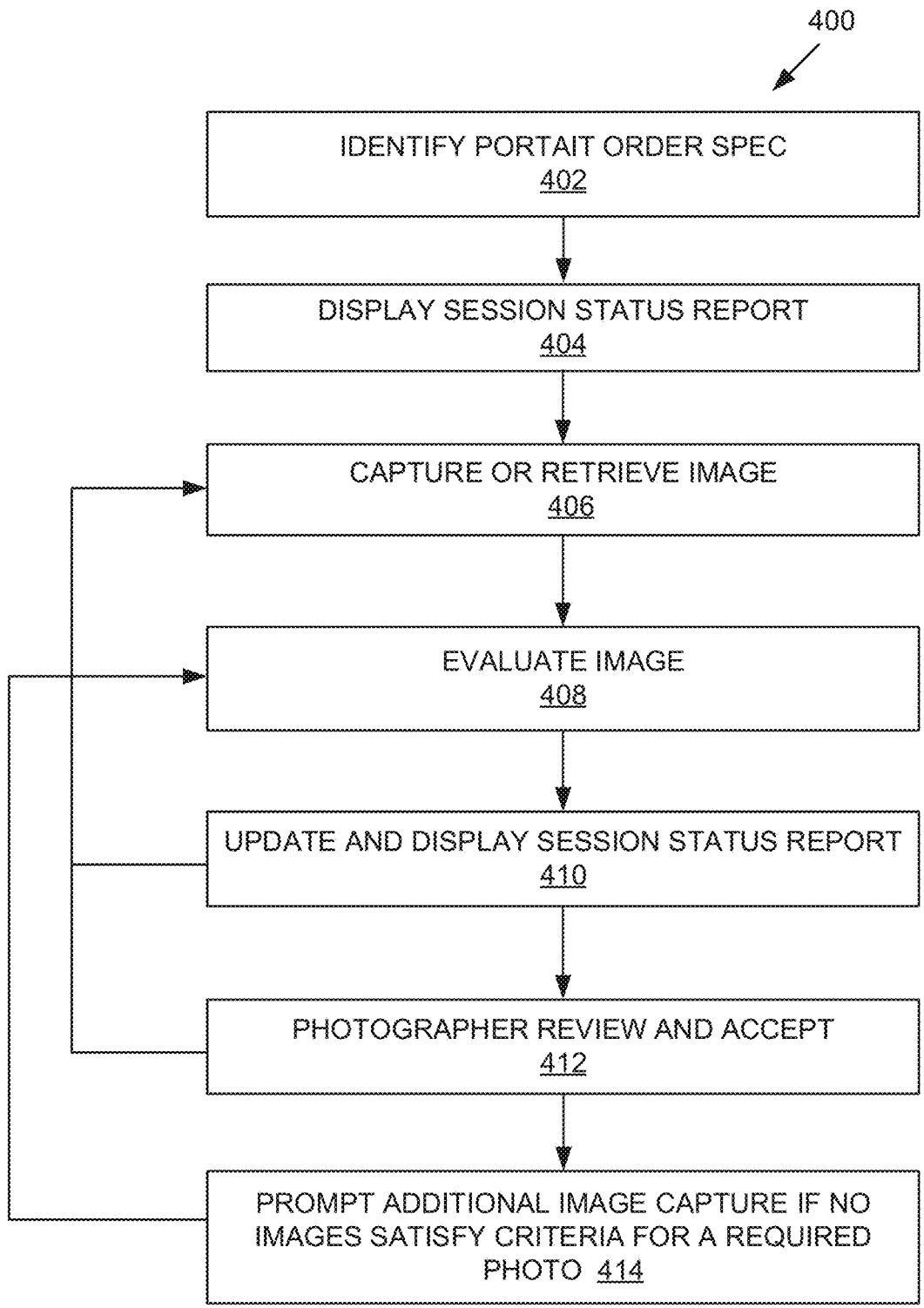
FIG. 10 is a flow chart illustrating an example method of automatically evaluating and suggesting photographs during a photography session.

FIG. 10 is a flow chart illustrating an example method 400 of automatically evaluating and suggesting photographs during a photography session. In this example, the method 400 includes operations 402, 404, 406, 408, and 410.

The operation 402 identifies a portrait order specification 112. The portrait order specification 112 is associated with a photography session, and contains at least a list of one or more required photographs 256, each having associated required criteria 258. Further details regarding an exemplary portrait order specification are discussed above with reference to FIG. 5. In some embodiments, the portrait order specification 112 can be selected by a photographer P using the computing device 142, or the computing device 146, by interacting with the session GUI display 280 of the session assistant 104. For example, the photographer P can select a portrait order specification 112 from among a plurality of portrait order specifications 112 included in the portrait order specification database 294 using user input mechanisms of the computing device 142. In other possible embodiments, the portrait order specification may be preselected or predefined by someone other than the photographer P. The graphical user-interface 106 can receive the selection of the particular portrait order specification 112, and can send the portrait order specification 112, or can actuate the portrait order specification 112 to be sent, from the portrait order specification database 294 to the evaluator 108.

The operation 404 displays the session status report 114 on the computing device 142 display via the session GUI display 280. Further details regarding the exemplary session status reports 114 are discussed above with reference to FIGS. 6-7. In some embodiments, the session status report indicates which of the required photographs 256 have been completed and which of the required photographs 256 still need to be completed during the photography session.

The operation 406 captures the image 110. Further details regarding exemplary image capture using the photography station 120 and the mobile photography system 170 are discussed above with reference to FIGS. 2-3. The image 110 can be stored in the image database 290 in the data store 129, and can also be sent to the evaluator 108 for processing. The operation 406 can also retrieve the image 110, for example, from the image database 290. In some embodiments, it may be desired to check if a portrait order specification 112 was completed during a photography session at some time after the photography session. In such embodiments, the image 110 can be sent from the image database 290 to the evaluator 108 for processing.

The operation 408 evaluates the image 110. Further details regarding exemplary image evaluation are discussed above with reference to FIG. 9 and the evaluator 108. Evaluation of the image 110 can associate the image 110 with one or more required photographs 256, determine whether the image 110 satisfies the required criteria 258 associated with any of the required photographs 256 included in the portrait order specification 112 identified in operation 402, determine the quality level of features included in the image 110 with respect to the required criteria 258 and determine a quality score of the image 110, and a rank of the image 110 relative to other images 110 also as associated with a required photograph 256 in the identified portrait order specification 112. In some embodiments, the image 110 can be automatically determined to satisfy the required criteria of one or more required photographs 256, and be designated as qualifying as the required photograph 256 at operation 408.

The operation 410 updates the session status report 114 on the computing device 142 display via the session GUI display 280. Further details regarding an exemplary updated session status reports 114 are discussed above with reference to FIG. 7. Updating the session status report can include checking one or more checkboxes 268, displaying an image preview 270 as a thumbnail representation of the image 110, listing the image identifier 272 of the image 110, and listing the rank 274 of the image 110.

In some embodiments, the method 400 can proceed back to the operation 406 after completing operation 410, such as if there are required photographs 256 within the portrait order specification 112 without at least one associated image 110, or if more images 110 are desired.

The operation 412 receives an indication that the image 110 satisfies the required criteria 258 for at least one required photograph 256, and thereby qualifies as the required photograph 256. In some embodiments, the indication is received at the computing device 142 through user input mechanisms, such as those discussed above, using the graphical user-interface 106. Further details regarding an exemplary graphical user-interface for receiving indications that an image 110 qualifies as one or more required photographs 256 are discussed above with reference to FIG. 8.

In some embodiments, the method 400 can proceed back to the operation 406 after completing the operation 412, such as if there are required photographs 256 within the portrait order specification 112 without at least one associated image 110, or if more images 110 are desired.

If there is at least one required photograph 256 without an image 110 associated with it, or if none of the images 110 are associated with, or satisfy, the required photographs 256, the operation 414 prompts the photographer P to take more images during the session. In some embodiments, the prompt can be an indicator, a pop-up dialog box, a flashing symbol or button, or any indicator to indicate to the photographer P that the session is not complete and there is at least one required photograph for which none of the images 110 taken during the session can satisfy the required criteria or be associated with. In some embodiments, the prompt can be displayed using the graphical user-interface 106. In some embodiments, the operation 414 can include capturing, or retrieving, one or more additional images 110, such as described above in connection with the operation 406.

In some embodiments, the method 400 can proceed back to the operation 408 after completing the operation 414, so as to evaluate the additional images 110.

In some embodiments, the operation 400 may be repeated, or alternatively executed as a batch process, for a set of images 110 stored in the image database 290 at some time after a photography session.

Figure 11:
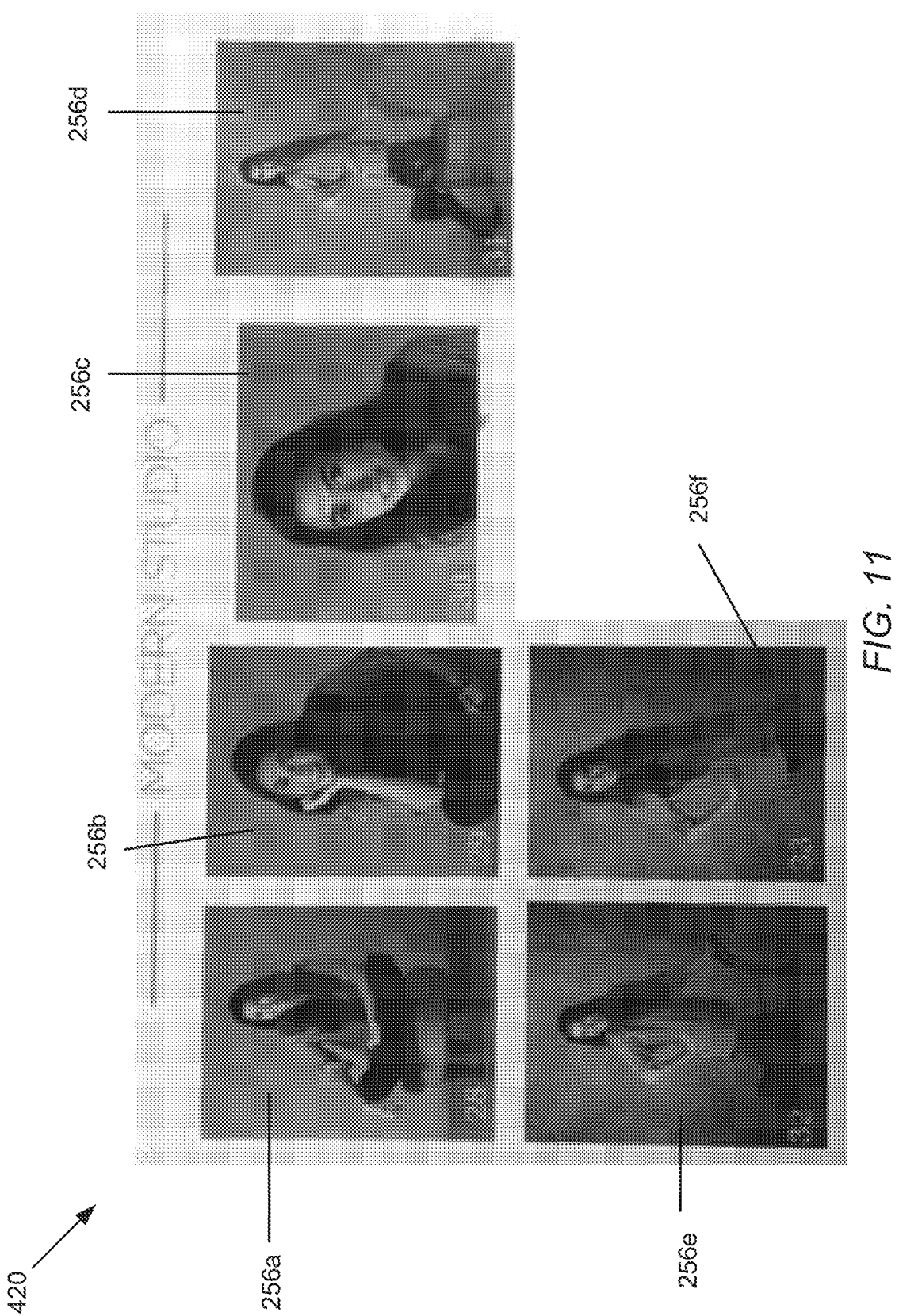
FIG. 11 is a schematic diagram of example required photographs captured during a photography session for a particular photography portrait order specification.

FIG. 11 is a schematic diagram of example required photographs 256 captured during a photography session 420 for a particular photography portrait order specification. In the illustrated example, the required photographs 256a-f were captured during the photography session 420. The required photographs 256a-f illustrate certain required criteria.

In the example shown, the required photograph 256a illustrates a full length crop, a full smile facial expression, a portrait image including a vertical subject orientation, and a seated, casual pose using a stool prop. In the example shown, the required photograph 256b further illustrates a full-length crop with a different pose without the stool prop. In the example shown, the required photograph 256c further illustrates a head and shoulders crop with a soft smile facial expression. In the example shown, the required photograph 256d further illustrates a full-length crop with a no smile facial expression and a one-knee on a chair prop pose. In the example shown, the required photograph 256e further illustrates similar criteria as required photograph 256d, but with a full smile facial expression. In the example shown, the required photograph 256f further illustrates similar criteria as required photograph 256e, but with a three-quarter length crop and no chair prop.

Figure 12:
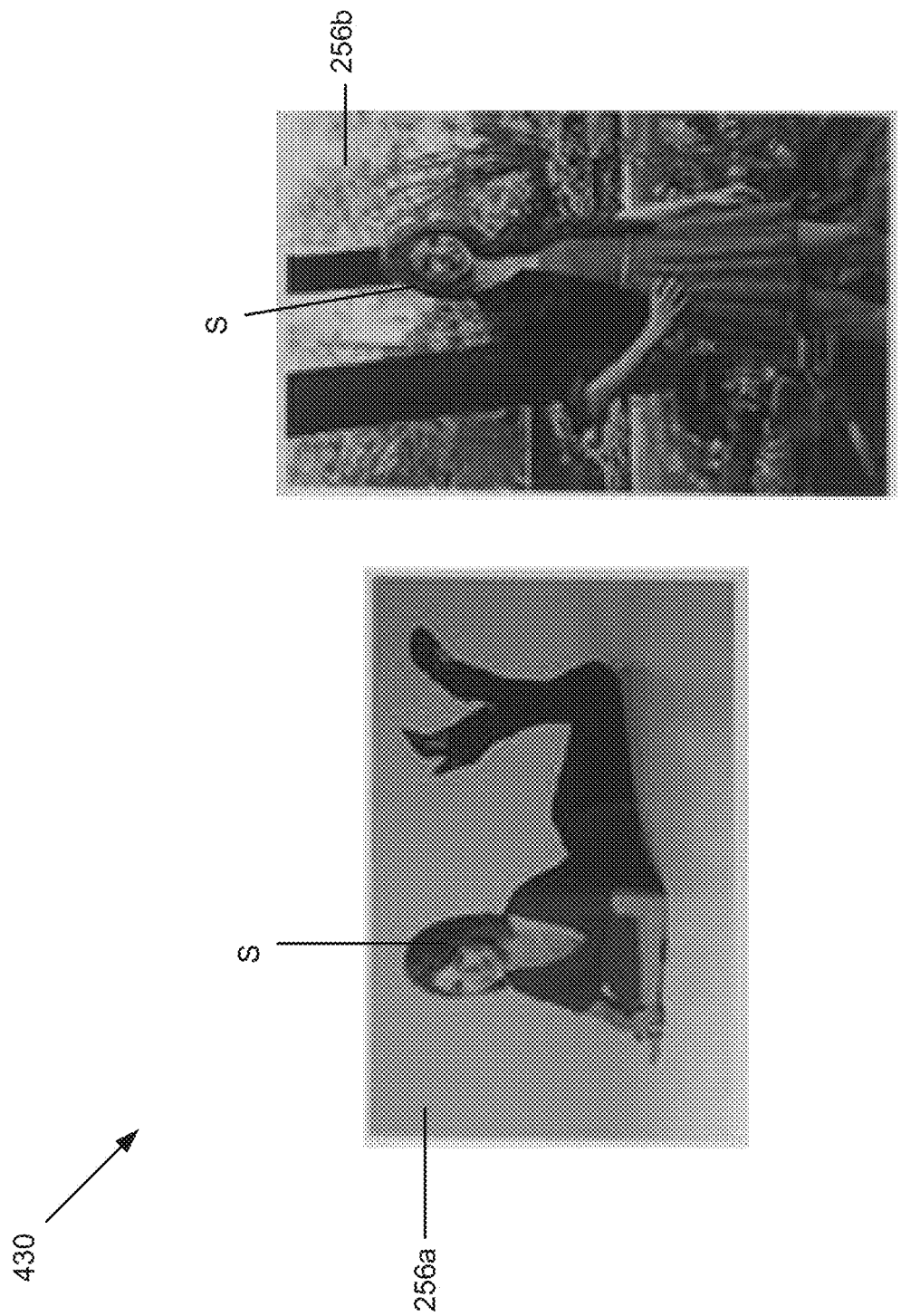
FIG. 12 is a schematic diagram of example required photographs captured during a photography session for a particular photography portrait order specification.

FIG. 12 is a schematic diagram of example required photographs 256 captured during a photography session 430 for a particular photography portrait order specification. In the illustrated example, the required photographs 256a-b were captured during the photography session 430. The required photographs 256a-b illustrate certain required criteria.

In the example shown, the required photograph 256a illustrates a full-length crop, a full smile facial expression, a landscape image including a horizontal subject orientation, and a laying-down, casual pose.

In the example shown, the required photograph 256b further illustrates a three-quarter crop and a portrait image including a vertical subject orientation.

Figure 13:
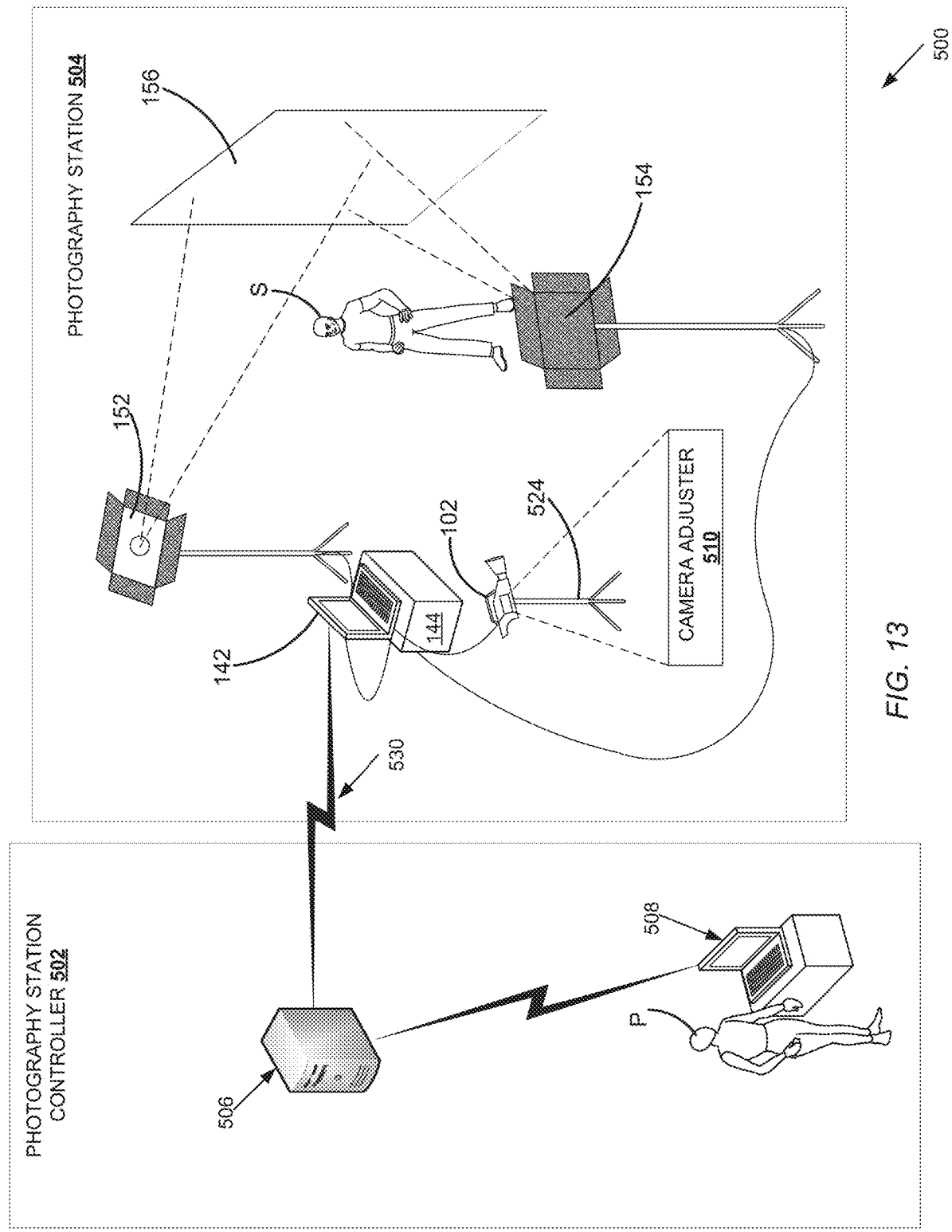
FIG. 13 is a schematic diagram illustrating an example remote photography system.

FIG. 13 is a schematic diagram illustrating an example remote photography system 500. The remote photography system 500 includes a photography station controller 502, and a photography station 504. The photography station controller 502 includes a photography station controller web service 506, a photographer computing device 508, and a photographer P. In the example shown, the photography station 504 includes a camera 102, a computing device 142, a lighting controller 144, foreground lights 152, background lights 154, a background 156, a camera assembly 524 and a subject S. In some examples, the camera 102 can include a camera adjuster 510. The remote photography system 500 can also include a network 530.

The remote photography system 500 includes a photography station controller 502. The photography station controller 502 is remote from the photography station 504. The photography station controller 502 is configured to interact with the photography station 504 to perform one or more photography sessions. In some examples, the photography station controller 502 is located in centralized location remote from a plurality of photography stations 504 and configured to operate with each of the plurality of photography stations 504.

In the example shown, the photography station controller 502 includes a photography station controller web service 506. The photography station controller web service 506 is a service which allows the photographer P to remotely perform and control a photography session and the photography station 504. The photography station controller web service 506 can run on a variety of computing devices including one or more servers, or the photographer computing device 508. In the example shown the photography station controller web service 506 is connected to the computing device 142 in the photography station 504 and the photographer computing device 508. In the example shown the photographer computing device 508 may send a message to the computing device 142 through the photography station controller web service 506. In some examples, the photography station controller web service 506 generates and provides one or more user-interfaces to the computing device 142 and the photographer computing device 508. Examples of these user-interfaces are illustrated and described in reference to FIGS. 19-21.

Different types of messages can be sent from the photography station controller to the computing device 142. The messages are network data packets which contain application data for the computing devices disclosed herein. In some examples the message packets are control message which cause the computing device 142 to control the image capture device 102. In other examples the messages include instructions which are provided to the subject S.

In some examples, the photography station controller web service 506 contains a computer application which automatically generates messages which are delivered to the photography station. These messages can cause the computing device to make adjustments to the camera 102, captures a photograph using the camera 102, or provide instructions to the subject S. In some examples the instructions can be audible instructions. The instructions can also be visual instructions. In some of these examples the photography controller web service may include an artificial intelligence, or machine learning to detect features and perform various operations in response.

In the example shown, the photography station controller 502 includes a photographer computing device 508. The photographer computing device 508 allows for the photographer P to communicate with the photography station 504 and control the camera 102. In the example shown the photographer computing device 508 is connected to the computing device 142 through a network using the photography station controller web service 506.

The remote photography system 500 includes a photography station 504. In some examples, the photography station 504 is similar to the photography station 120, as illustrated and described in FIG. 2. The photography station 504 can include any scene for photography. One example of the photography station 504 includes a photography studio which is designed to provide optimal lighting. In some examples, the photography station 504 is a mobile studio which can be set up in any of a variety of rooms. For example, the photography station can be indoors, outdoors, or in a professional studio.

The photography station 504 operates to capture one or more images of one or more subjects S, while receiving instructions and controls from the photography station controller 502. In some embodiments, the photography station 504 is controlled remotely by a photographer P, who can interact with the subject S to guide the subject S to a good expression pose, etc., for satisfying the criteria required in the portrait order specification. These instructions, and the controls from the camera can be provided remotely through a network, such as the Internet.

In the example shown, the photography station 504 includes a camera 102. The camera 102 is typically a professional quality digital camera that captures high quality images. An example of the camera 102 is described and illustrated in reference to FIG. 15.

The camera 102 can include a camera adjuster 510. The camera adjuster 510 can adjust the camera mechanically, and digitally to capture an ideal image of the subject S. An example of the camera adjuster 510 is illustrated and described in reference to FIG. 17.

In the example shown, the photography station 504 includes a computing device 142. The computing device 142 is used to receive messages from the photography station controller 502 and take various actions based on these messages. The computing device 142 can connect to the photography station controller 502 over a network, such as the Internet. In some examples, the computing device 142 can include the session assistant 104. In such embodiments, the computing device 142 and camera 102 form the hardware implementation of the photography system 100. The computing device 142 can include a display which displays the graphical user-interface to interact with the subject S. An example of such a user-interface is illustrated and described in reference to FIG. 21.

In the example shown, the photography station 504 includes a lighting controller 144. The lighting controller 144 operates, for example, to synchronize operation of the camera 102 with the foreground lights 152 and the background lights 154. Synchronization can alternatively be performed by the computing device 142 in some embodiments. In some examples, the controller is connected both to the camera 102 and the computing device 142.

In the example shown, the photography station 504 includes foreground lights 152 and background lights 154, and a background 156. The foreground lights are arranged at least partially forward of the subject S to illuminate the subject S while an image 110 is being taken. The background lights 154 are arranged and configured to illuminate the background 156. The background 156 is typically a sheet of one or more materials that is arranged behind a subject S while an image 110 of the subject S is captured. The foreground lights 152 and background lights 154, and a background 156 are illustrated and described greater detail in reference to FIG. 2.

In the example shown, the photography station 504 includes a camera assembly 524. The camera assembly 524 includes additional hardware to facilitate some of the embodiments describe herein. The camera assembly 524 can include a support device, for example a tripod, to stabilize image capture device to create hands free environment for the subjects. Additionally, the camera assembly 524, in some embodiments, include devices and mechanisms which allow the remote photographer to mechanically control the image capture device.

Also shown is a network 530. The network 530 is used to connect the photography station controller 502 to the photography station 504. The network 530 can be a public network, such as the Internet.

In some examples, the photography station 504 is part of a portable equipment kit. For example, the kit can have at least some of the above hardware, lighting devices, and other professional devices, which can be brought to and set up at a sight for enabling a remote photography session.

Figure 14:
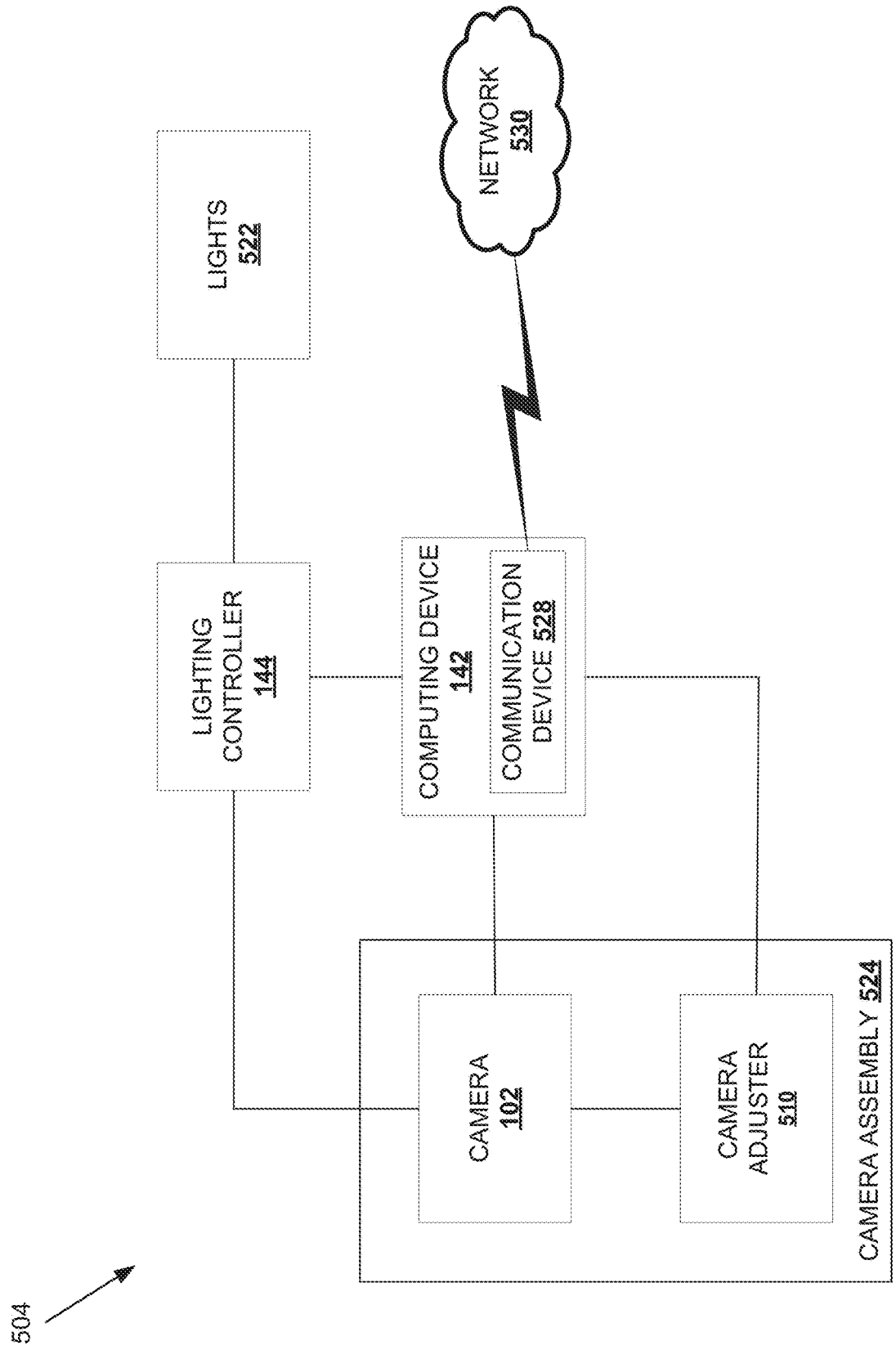
FIG. 14 is a schematic diagram illustrating an example photography station.

FIG. 14 is a schematic diagram illustrating an example photography station 504. In the embodiment shown, the photography station 504 includes a lighting controller 144, lights 522, camera assembly 524, and computing device 142. The camera assembly 524 includes a camera 102 and a camera adjuster 510. The computing device 142 includes a communication device 528. The data communication network 530 is also shown.

Some embodiments further include of the photography station 504 include a lighting controller 144. The lighting controller 144 operates, for example, to synchronize operation of camera 102 and the lights 522. Synchronization can alternatively be performed by the computing device 142 in some embodiments. An example of the lighting controller 144 is illustrated and described in reference to FIG. 16.

In some examples, the photography station 504 includes lights 522. Lights 522 include one or more lights that operate to illuminate to subject, background, or a scene. The lights 522 can include one or more light sources. Examples of light sources include incandescent bulbs, fluorescent lamps, light-emitting diodes, and discharge lamps. Some examples include one or more foreground lights and one or more background lights. Example of lights are illustrated and described in further detail in reference to FIGS. 2, and 13.

In some examples, the photography station 504 includes a camera assembly 524. The camera assembly includes a camera 102, and a camera adjuster 510. The camera adjuster 510 makes adjustments to the camera. In some examples the camera assembly 524 includes additional hardware to facilitate some of the embodiments describe herein. The camera assembly 524 can include a support device, for example a tripod, to stabilize image capture device to create hands free environment for the subjects. Additionally, the camera assembly 524 can include devices and mechanisms which allow the remote photographer to mechanically control the image capture device.

The camera assembly 524 includes a camera 102. The camera 102 is typically a professional quality digital camera that captures high quality images. An example of a camera 102 is illustrated and described in reference to FIG. 14. In some examples the camera is connected to a smart device, which includes audio communication and capture interface.

The camera assembly 524 can also include a camera adjuster 510. The camera adjuster 510 is used to make adjustments to the camera 102. In some examples these, adjustments are mechanical. For example, the camera assembly 524 is moved either by the camera adjuster 510. In another example, the camera 102 orientation is changed using the camera adjuster 510. In some embodiments, the camera adjuster 510 can modify camera settings. For example, the camera adjuster 510 can modify either optical zoom or digital zoom. Other examples include changing exposure or focus settings. In some examples the camera adjuster 510 is an application which runs on a processor on the camera 102. The camera adjuster is illustrated and described in more detail in reference to FIG. 17.

In some examples, the photography station 504 includes a computing device 142. The computing device 142 can be directly or indirectly connected to the camera 102 to receive digital data. The computing device 142 can also be directly or indirectly connected to the camera adjuster 510 and the lighting controller 144. Direct connections include wired connections through one or more communication cables, and wireless communication using wireless communication devices (e.g., radio, infrared, etc.). Indirect connections include communication through one or more intermediary devices, such as a lighting controller 144, other communication devices, other computing devices, a data communication network, and the like. Indirect connections include any communication link in which data can be communicated from one device to another device.

The computing device 142 can be any of a wide variety of computing devices which includes a memory, a processor, and communication channels. Examples of computing devices include desktops, laptops, tablets, and smart phones. An example of the computing device is illustrated and described in reference to FIG. 4.

The computing device 142 includes a communication device 528. The communication device is a device which allows the computing device to connect to a public or private network. Examples include wired communication device, or wireless communication devices. Example of communication devices include Ethernet, USB, Firewire®, Wi-fi®, cellular, Bluetooth®, etc. In the typical embodiment the communication device allows the computing device to connect to a network 530 such as the Internet.

In some examples, the photography station 504 includes a network 530. The network 530 includes public or private networks. In the common example the network allows the computing device to connect to a public network, such as the Internet.

Figure 15:
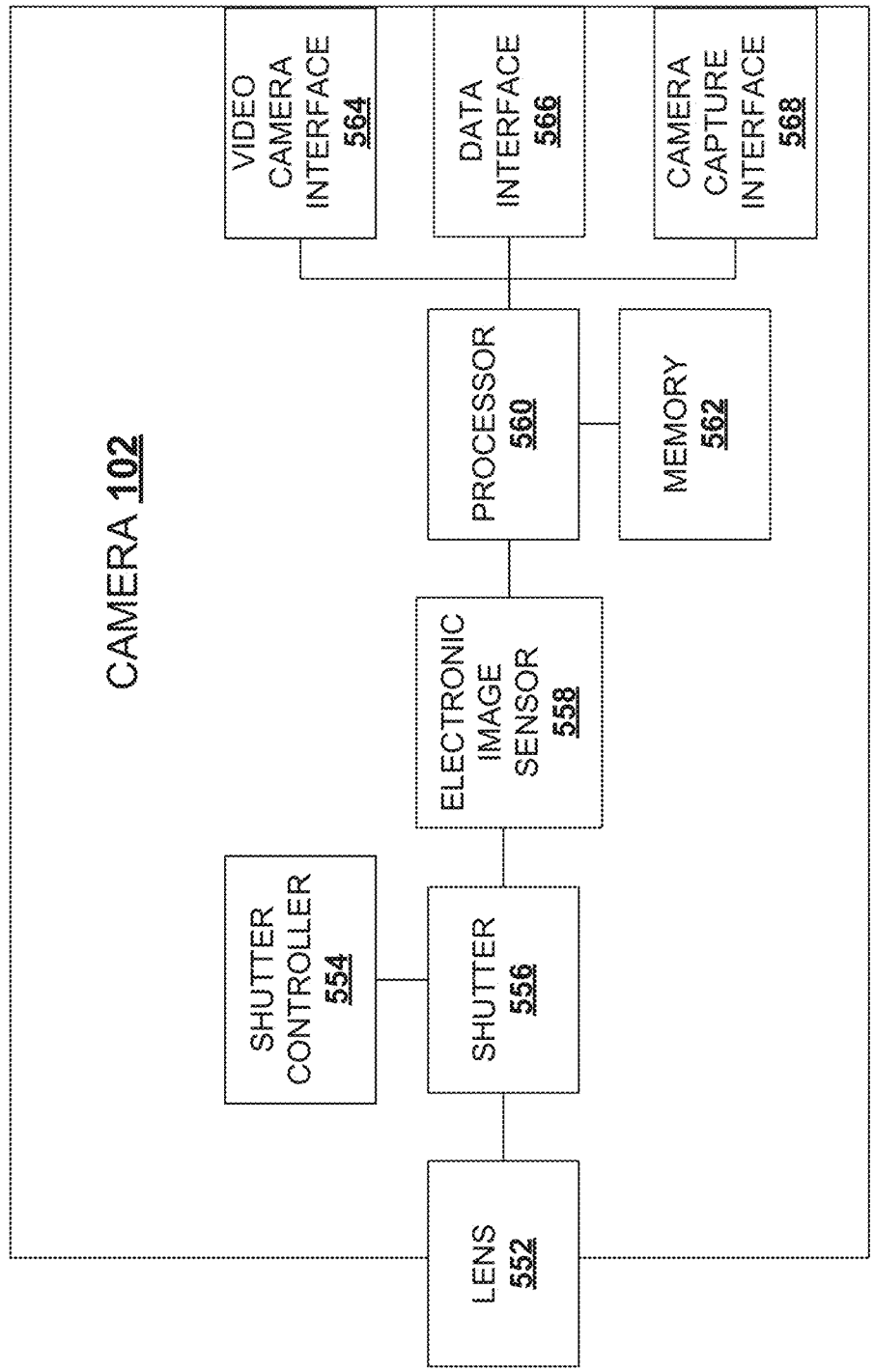
FIG. 15 is a schematic block diagram of an example camera.

FIG. 15 is a schematic block diagram of an example camera 102. The camera 102 can include a lens 552, a shutter controller 554, a shutter 556, an electronic image sensor 558, a processor 560, a memory 562, a video camera interface 564, a data interface 566, and a camera capture interface 568.

The camera 102 is typically a professional or high-quality digital camera. The camera 102 includes an electronic image sensor 558 for converting an optical image to an electric signal, at least one processor 560 for controlling the operation of the camera 102, and a memory 562 for storing the electric signal in the form of digital image data.

An example of the electronic image sensor 558 is a charge-coupled device (CCD). Another example of the electronic image sensor 558 is a complementary metal-oxide-semiconductor (CMOS) active-pixel sensor. The electronic image sensor 558 receives light from a subject and background and converts the received light into electrical signals. The signals are converted into a voltage, which is then sampled, digitized, and stored as digital image data in the memory device 562.

The memory 562 can include various different forms of computer readable storage devices, such as random access memory. In some embodiments the memory 562 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the camera 102 includes three main sections: a lens 552, a shutter 556, and an electronic image sensor 558. Generally, electronic image sensor 558 have relatively rapid exposure speeds. However, the process of moving the captured image from the electronic image sensor 558 to an image storage area such as the memory 562 is slower than the time to acquire the image. Accordingly, in order to reduce the time between acquiring the backlit and front-lit images as discussed herein—preferably to further reduce any motion of the foreground object in the time period between shots—some embodiments include an electronic image sensor 558 that is an interline transfer CCD. One example of a suitable interline transfer CCD is the model number KAI-11002, available from Eastman Kodak Company Kodak, of Rochester, N.Y. This type of electronic image sensor 558 includes arrays of photodiodes interspaced with arrays of shift registers. In operation, after capturing a first image, photodiodes transfer the electrons to the adjacent shift registers and become ready thereafter to capture the next image. Because of the close proximity between the photodiodes and associated shift registers, the imaging-transfer cycles can be very short. Thus, in some embodiments the digital camera 102 can rapidly capture a first image, transfer the first image to the memory 562 (where it is temporarily stored) and then capture a second image. After the sequence of images, both of the images can be downloaded to the appropriate longer term memory location, such as a second memory 562.

Since the electronic image sensor 558 continues to integrate the second image while the first image is read out, a shutter 556 is employed in front of the electronic image sensor 558. In some embodiments, a shutter 556 is used and is synchronized by the processor 560. The shutter 556 opens prior to the capture of the first image and remains open for the duration of the second flash. It then receives a signal to close in order to eliminate further exposure from ambient light. The exposure may be controlled, shutter 140 in some embodiments.

The lens 552 is located in front of the shutter 556 and is selected to provide the appropriate photographic characteristics of light transmission, depth of focus, etc. In some embodiments, the lens 552 is selected between 50 and 250 mm, with the image taken at a f-stop generally in the range of f16 to f22. This provides a zone focus for the image. It also generally eliminates concerns regarding ambient light. However, it will be appreciated that any number of lenses, focusing, and f-stops may be employed in other embodiments.

In some embodiments, the camera 102 includes a video camera interface 564 and a data interface 566. In some examples, the video camera interface 564 communicates live video data from the camera 102 to the lighting controller 144, and the computing device 142 as shown in the embodiment illustrated in FIG. 14. The data interface 566 is a data communication interface that sends and receives digital data to communicate with another device, such as the lighting controller 144 or the computing device 142. The data interface 566 is also used in some embodiments to transfer captured digital images from the memory device 562 to another device, such as the controller 144 or the computing device 142. Examples of the video camera interface 564 and the data interface 566 are USB interfaces. In some embodiments video camera interface 564 and the data interface 566 are the same (e.g., a single interface), while in other embodiments they are separate interfaces.

In some examples, the camera 102 includes a camera capture interface 568. The camera capture interface 568 interfaces with the camera adjuster 510, as shown in the example of FIG. 14. In some embodiments the camera capture interface receives image capture message from the computing device that instructs the camera 102 to capture one or more images. In other examples, the camera capture interface receives image capture messages from the lighting controller 144 that instruct the digital camera 102 to capture one or more images. The camera capture interface 568 can also receive messages to adjust the mechanical or digital settings of the camera 102. In some embodiments the camera capture interface is built in as part of the data interface 566.

In some examples, to initiate the capture of the images, the camera capture interface 568 is used to trigger the capturing of an image. In some examples the camera capture interface 568 can be used to make mechanical or digital adjustments to the camera. For example, the camera capture interface 568 can receive inputs which trigger instructions that when executed by the processor 560 adjusts the focus of the camera. In another example, the camera capture interface 568 can receive inputs which trigger the capture of an image.

Although the camera 102 is described in terms of a digital camera, another possible embodiment utilizes a film camera, which captures photographs on light-sensitive film. The photographs are then converted into a digital form, such as by developing the film and generating a print, which is then scanned to convert the print photograph into a digital image that can be processed in the same way as a digital image captured directly from the digital camera, as described herein.

Figure 16:
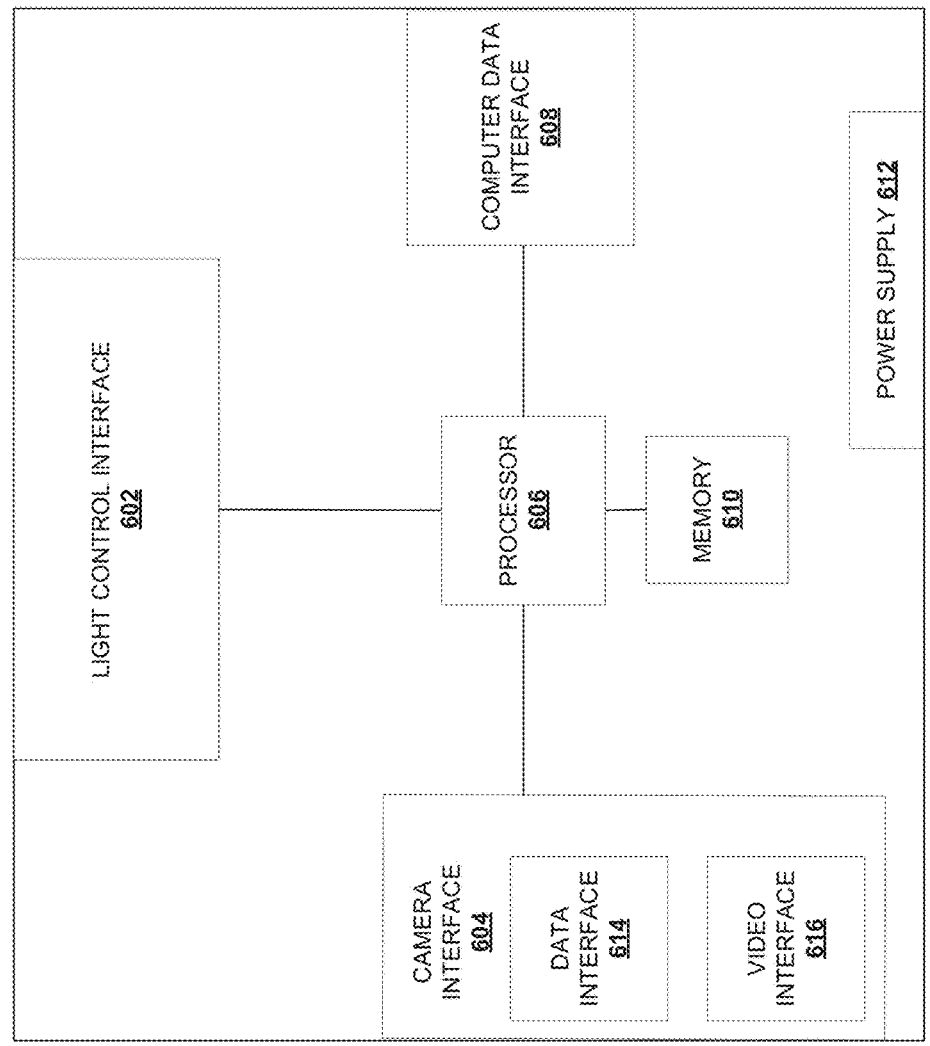
FIG. 16. is a schematic diagram of an example lighting controller.

FIG. 16. is a schematic diagram of an example lighting controller 144. In the embodiment shown, the lighting controller 144 includes a light control interface 602, a camera interface 604, a processor 606, a computer data interface 608, a memory 610, and a power supply 612. In some examples, the camera interface 604 includes a data interface 614 and a video interface 616.

In the embodiment shown, the lighting controller 144 includes a light control interface 602. Light control interface 602 allows the lighting controller 144 to control the operation of one or more lights, such as the foreground lights 152 and background lights 154, as shown in FIG. 13. In some embodiments light control interface 602 is a send only interface that does not receive return communications from the lights. Other embodiments permit bidirectional communication. Light control interface 602 is operable to selectively illuminate one or more lights at a given time. Controller 144 operates to synchronize the illumination of the lights with the operation of camera 102.

In the embodiment shown, the lighting controller 144 includes a camera interface 604. Camera interface 604 allows controller 144 to communicate with camera 102, as shown in FIGS. 13-14. In some embodiments, camera interface 604 includes a data interface 614 that communicates with data interface 566 of camera 102 (shown in FIG. 15), and a video interface 616 that communicates with video camera interface 564 of camera 102 (also shown in FIG. 15).

Examples of such interfaces include universal serial bus interfaces. Other embodiments include other interfaces.

In the embodiment shown, the lighting controller 144 includes a processor 606 and a memory 610. The processor 606 performs control operations of the lighting controller 144, and interfaces with the memory 610. Examples of suitable processors and memory are described herein.

In the embodiment shown, the lighting controller 144 includes a computer data interface 608. Computer data interface 608 allows controller 144 to send and receive digital data with computing device 142, as shown in FIGS. 13-14. An example of computer data interface 608 is a universal serial bus interface, although other communication interfaces are used in other embodiments, such as a wireless or serial bus interface.

In the embodiment shown, the lighting controller 144 includes a power supply 612. In some embodiments a power supply 612 is provided to receive power, such as through a power cord, and to distribute the power to other components of the photography station 504, such as through one or more additional power cords. Other embodiments include one or more batteries. Further, in some embodiments the lighting controller 144 receives power from another device.

Figure 17:
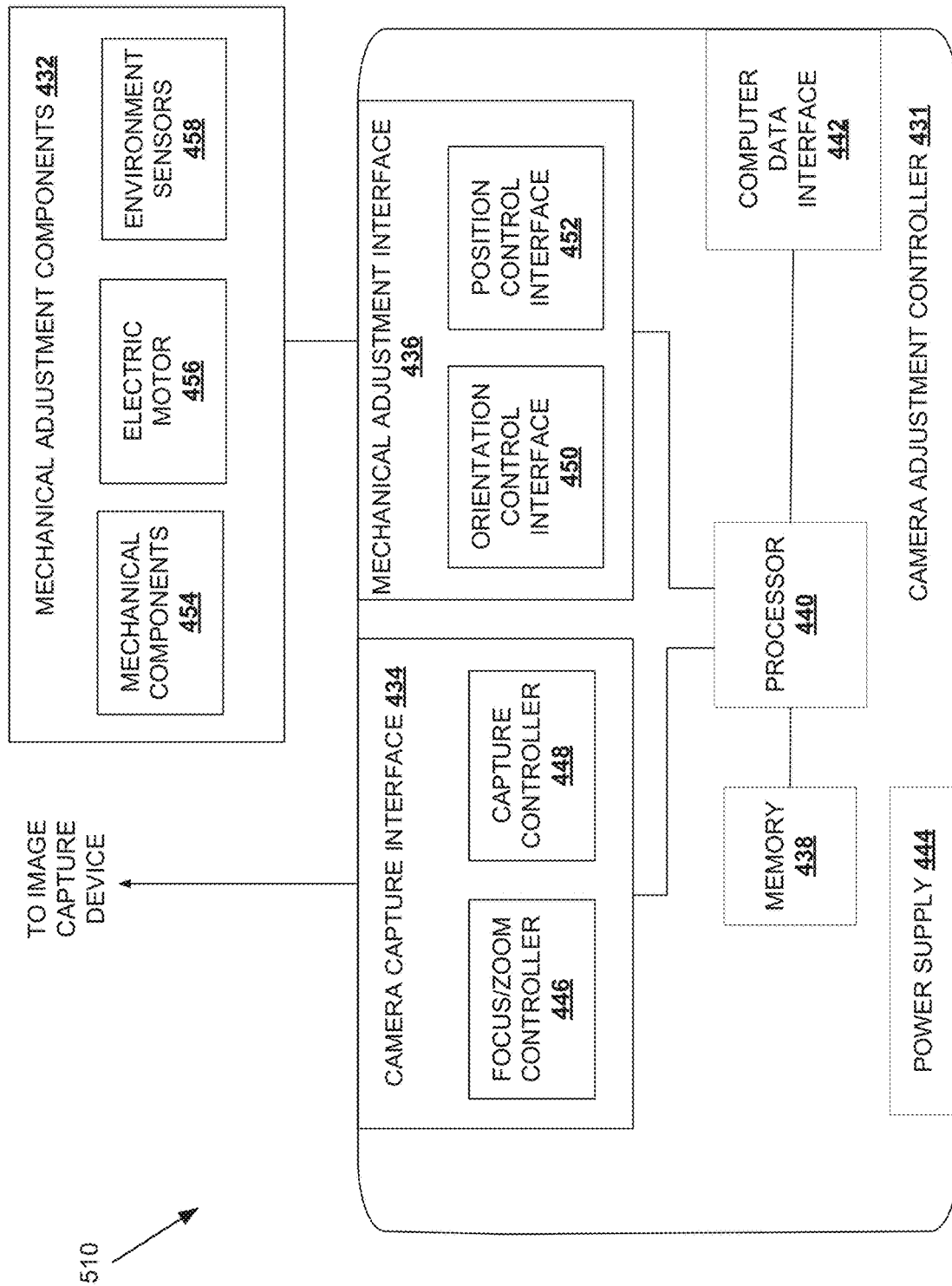
FIG. 17 is a schematic diagram illustrating a camera adjuster.

FIG. 17 is a schematic diagram illustrating a camera adjuster 510. In some examples, the camera adjuster 510 includes a camera adjustment controller 431 and mechanical adjustment components 432. In the embodiment shown, the camera adjustment controller 431 includes a camera capture interface 434, a mechanical adjustment interface 436, a memory 438, a processor 440, a computer data interface 442, and a power supply 444. The camera capture interface 434 can include a focus/zoom controller 446, and a capture controller 448. The mechanical adjustment interface 436 can include orientation control interface 450 and position control interface 452. In the embodiment shown, the mechanical adjustment components 432 includes mechanical components 454, electric motor 456 and environment sensors 458.

In some examples, the camera adjuster 510 includes a camera adjustment controller 431. The camera adjustment controller 431 is used to receive messages from the photography station controller 502. In some examples the messages cause the adjustment controller to make adjustments to the camera 102 or the camera assembly 524, as illustrated and described in reference to FIG. 14.

In some examples the camera adjuster 510 works within a closed feedback loop. For, example the camera adjuster 510 may automatically adjust the f-stop or exposure time of the camera to capture an image with a required lighting ratio. Closed feedback loops included in the camera adjuster 510 can also be used to control the zoom, lighting, and other mechanical or digital adjustments to the camera or the photography station. In one example, the photography station includes a gray card which is used to assist with the adjusting of exposure and white balance settings by the photographer, or a feedback loop included in camera adjuster 510.

In the embodiment shown, the camera adjustment controller 431 includes a camera capture interface 434. The camera capture interface 434 is used as an interface between the processor and the image capture device.

In some embodiments, the camera capture interface 434 includes a focus/zoom controller 446. The focus/zoom controller 446 can be used to modify the focus and zoom of the camera 102. Examples of these adjustments include, mechanical adjustments to the camera 102 and digital adjustments to the camera 102.

The camera capture interface 434 can include a capture controller 448. The camera capture interface 434 is used as an interface between the processor 440 and the image capture device. The interface can be used to send a message to initiate the capture of a photograph. In some examples, the camera capture interface 434 is directed through the lighting controller 144 to synchronize the capture of an image with the flash form the lighting.

In the embodiment shown, the camera adjustment controller 431 includes a mechanical adjustment interface 436. The mechanical adjustment interface 436 is used to interface between the processor and the mechanical adjustment components 432.

The mechanical adjustment interface 436 can include an orientation control interface 450. The orientation control interface 450 controls the angle of the image capture device. In some examples the camera is adjusted to different angles including up, down right and left. Additionally, the orientation control can include controls for rotating the camera. For example, if the camera is not level the processor 440 can instruct the mechanical adjustment components 432 to rotate the camera to capture a level picture through the orientation control interface.

The mechanical adjustment interface 436 can include a position control interface 452. The position control interface 452 can transfer instructions form the processor 440 to the mechanical adjustment components 432 which change the position of the image capture device. For example, the processor can instruct to move the image capture device to a different location in the photography station.

In the embodiment shown, the lighting controller 144 includes a processor 440 and a memory 438. The processor 440 performs control operations of the camera adjustment controller 431, and interfaces with the memory 438. Examples of suitable processors and memory are described herein.

In some examples, the camera adjuster 510 includes a computer data interface 442. Computer data interface 442 allows, the camera adjustment controller 431 to send and receive digital data with computing device 142, as shown in FIGS. 13-14. An example of computer data interface 608 is a universal serial bus interface, although other communication interfaces are used in other embodiments, such as a wireless or serial bus interface.

In some embodiments a power supply 444 is provided to receive power, such as through a power cord, and to distribute the power to other components of the camera adjuster 510, such as through one or more additional power cords. Other embodiments include one or more batteries. Further, in some embodiments camera adjuster 510 receives power from another device.

In some examples, the camera adjuster 510 includes mechanical adjustment components 432. The mechanical adjustment components can be any of a variety of components necessary to make adjustments to the image capture device. In some examples mechanical adjustments include any adjustment to an image capture device except for digital adjustments. In the example shown the mechanical adjustment components 432 include mechanical components 454, electric motor 456, and environment sensors 458 which work together to make mechanical adjustments to the image capture device.

In the example shown, the mechanical adjustment components 432 include mechanical components 454. The mechanical components 454 can include an of a variety of components for adjust the image capture device. Including components to switch the lens of a camera, components to move the cameras location, and components to modify the orientation of the image capture device.

In the example shown, the mechanical adjustment components 432 include an electric motor 456. The electric motor 456 is used to move the position or orientation of the camera assembly. The electric motor 456 is used in conjunction with the mechanical components to make the required adjustments.

In the example shown, the mechanical adjustment components 432 include environment sensors 458. The environment sensors 458 are used to assist in the movement, and orientation of the camera assembly 424. The environment sensors 458 can include any sensor which allows the positioning and movement of the camera assembly 524. Examples of such sensors include, accelerometer, motion sensors, LIDAR, GPS, one or more cameras, proximity sensors, ambient light sensors, gyroscope, barometer, and any other sensor which provide information about an environment.

Figure 18:
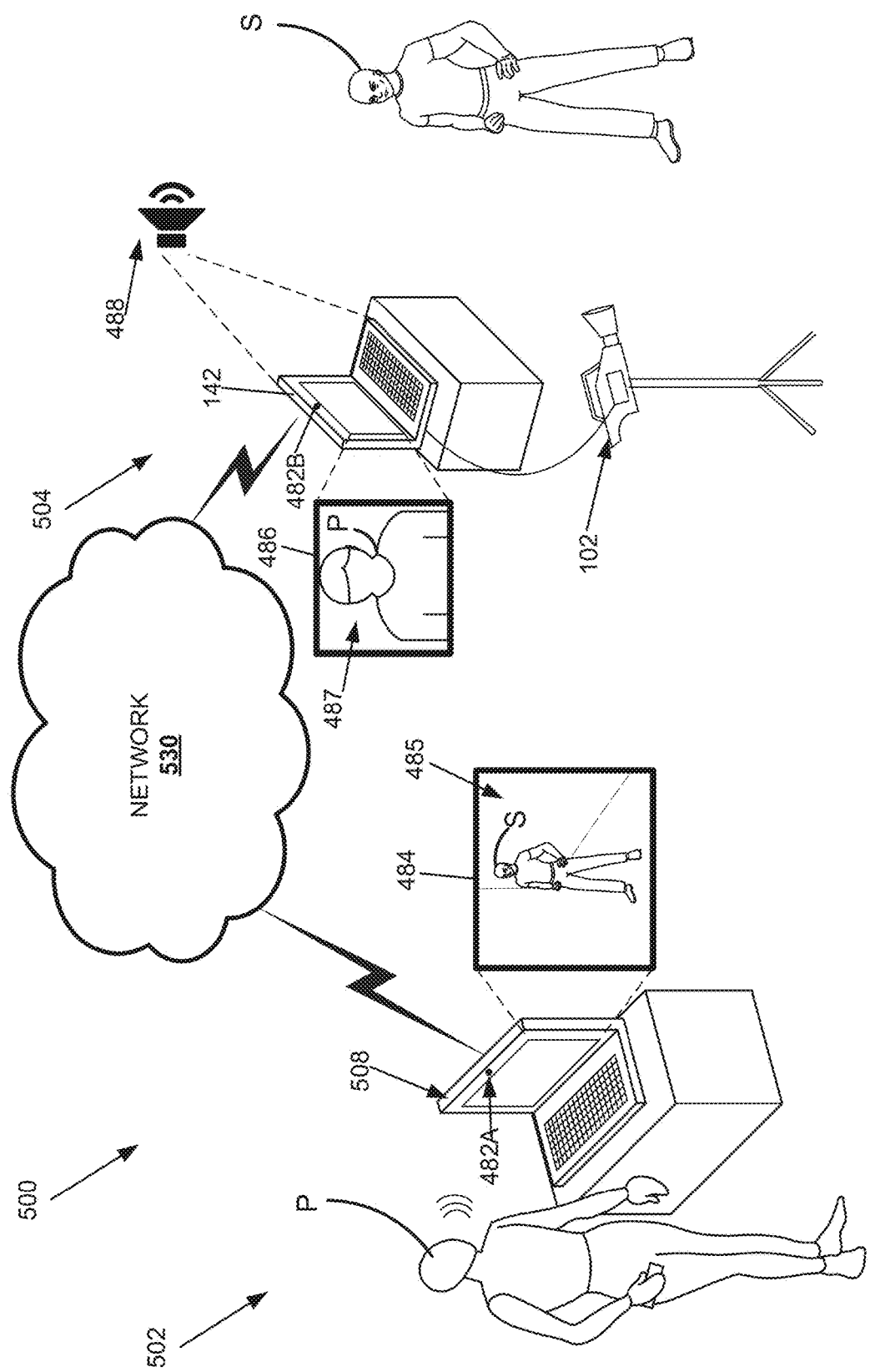
FIG. 18 is a schematic diagram illustrating an example remote photography system.

FIG. 18 is a schematic diagram illustrating an example remote photography system 500. The example remote photography system 500 is another example of the system 500 illustrated and described in reference to FIG. 13. The example remote photography system 500 includes the photography station controller 502 and the photography station 504. In this example, the photography station controller 502 includes a photographer computing device 508 with a webcam 482A; a remote photography application 484 that provides a photographer's user-interface 485. The example photography station 504 includes a computing device 142 with a webcam 482B; a photography station application 486 that provides a photography station user-interface 487; and a camera 102. Audible instructions 488 are also shown, as well as a photographer P and a subject S.

In the embodiment shown, the system 500 includes a photographer computing device 508. The photographer computing device 508 is remotely connected to the computing device 142 over the network 530. In the example shown the photographer computing device 508 includes a webcam 482A. The webcam is configured to capture live video of the photographer which is sent over the network 530 to the photography station computing device 142. The photographer computing device 508 is an example photographer computing device 508 illustrated and described in reference to FIG. 13.

The photographer computing device 508 is configured to include a remote photography application 484. The remote photography application includes a video conferencing application and an application to control a camera remotely to capture one or more photographs during a photography session. The photographer can provide instructions to the S using the video conferencing application on the photographer computing device 508. An example user-interface 485 of the remote photography application is illustrated and described in reference to FIGS. 19-20.

In the embodiment shown, the system 500 includes a computing device 142. The computing device 142 is remotely connected to the photographer computing device 508 over the network 530. An example of the computing device 142 is illustrated and described in reference to FIG. 13.

In the example shown the computing device 142 includes a webcam 482B and a photography station application 486, and audible instructions 488 are also shown that are presented by the computing device 142. The webcam 482B is used to record the subject S during a photography session. The recording is sent over the network 530 to the photographer who views the images as part of the video conferencing application. The photographer can provide instructions to the subject S these instructions 488 are played using speakers on the computing device 142.

Additional cameras or monitoring devices capturing live video or other images from different viewpoints of the photography station can be used to provide more information to the remote photographer.

The photography station application 486 can include the video conference application to allow the subject and photographer engage in remote instructions related to the photoshoot. An example user-interface 487 of the photography station application 486 is illustrated and described in reference to FIG. 21.

A person of ordinary skill in the art would recognize that the video conference application allows for live feedback to assess the quality and status of the images captured by the camera 102. Generally, different photography environments have different challenges, such as lighting in an outdoor setting. A video conference application allows the photographer, or in some instances an artificial intelligence application, to provide profession solutions for these different, sometimes challenging environments. The video conference application allows the photographer to make these adjustments before capturing a photograph. In some examples, the photographer may be able to take less pictures on the camera 102 because the video conferencing application allows for live feedback. Accordingly, the photographer can ensure the images captured are of high quality.

Other tools proving real time quality and status of images can also be used as part of the photography station application. Such tools include virtual reality tools and augmented reality tools. For example, the video conferencing application may include virtual objects, guides, or backgrounds which are provided as visual instructions to the subject S.

In the embodiment shown, the system 500 includes a network 530. The network 530 can be any type of network which allows the photographer P to be remote form the photography station. Examples include local area networking environment or a wide area networking environment (such as the Internet).

In the embodiment shown, the system 500 includes a camera 102. The camera 102 is another example of the camera 102 illustrated and described in reference to FIGS. 13 and 15.

Figure 19:
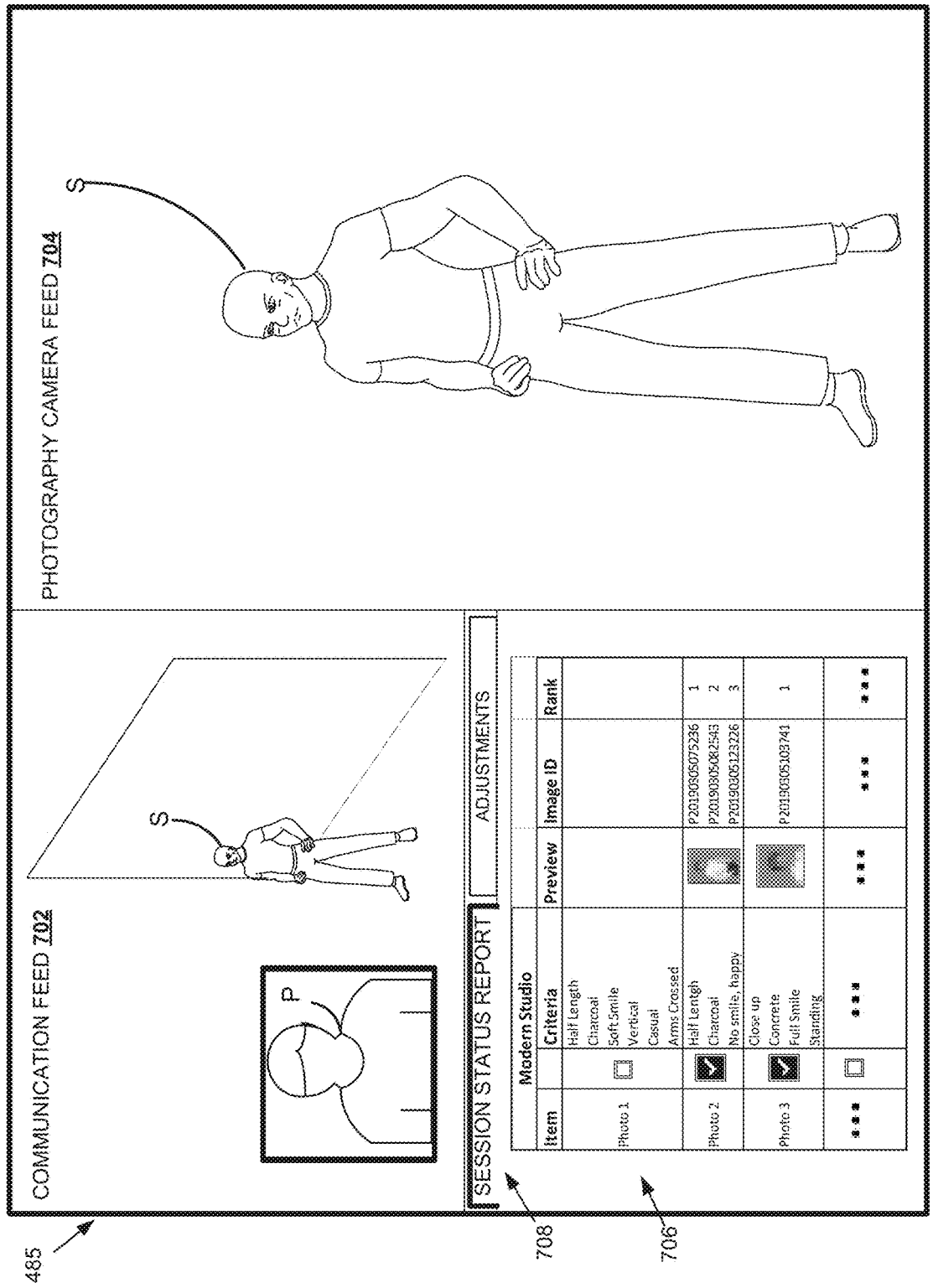
FIG. 19. is an example user-interface for a remote photographer.
Figure 20:
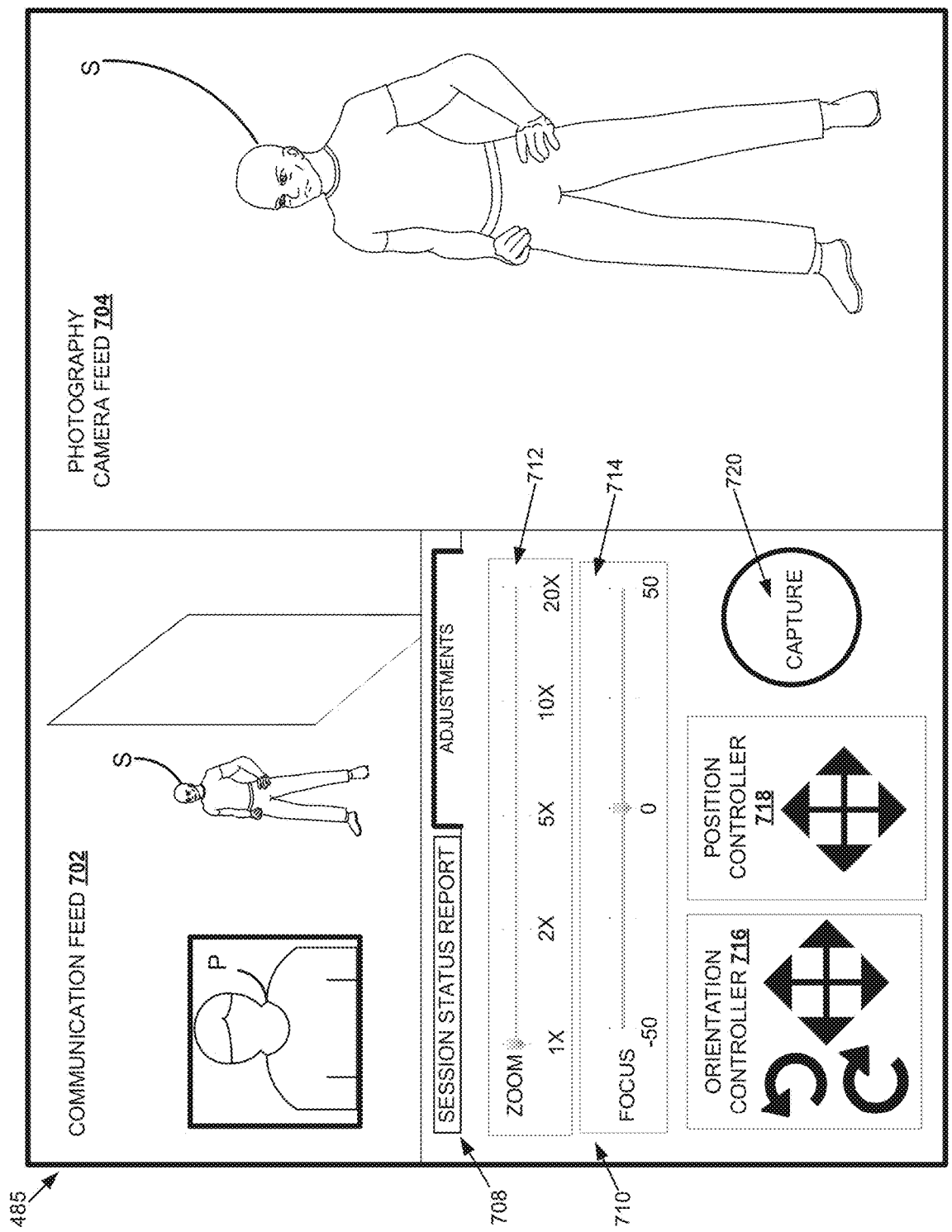
FIG. 20. is an example user-interface for a remote photographer.
Figure 21:
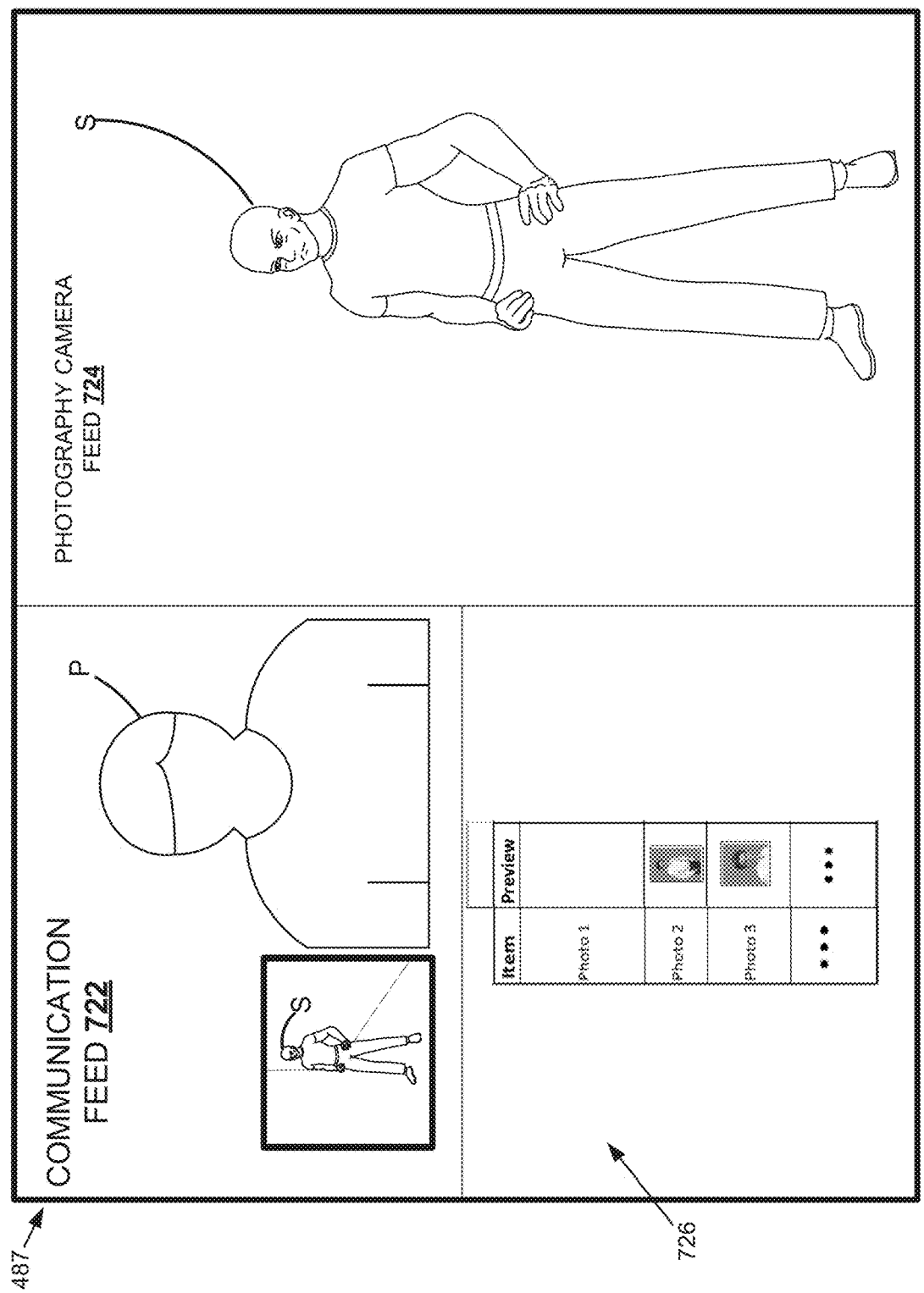
FIG. 21 is an example user-interface for a photography station.

FIGS. 19-21 are example user-interfaces for the remote photography system 500. The FIG's include possible example user-interfaces. In addition to many other possible user-interfaces some user-interfaces included in this disclosure may include modification which are optimized to work on different types of computing devices. For example, modifications to the user-interfaces to display the application could have a version optimized to run on a smart phone, another on a table, and another on a laptop.

FIG. 19. is an example user-interface 485 for a remote photographer. In the example shown, the user-interface 485 includes a live communication feed window 702, a photography camera feed window 704, a session status report window 706. The example shown also includes a window navigation tab 708 in the session status report window 706, which allows the user to navigate to an adjustments window.

The example user-interface 485 includes a live communication feed window 702. The live communication feed window 702 can include a typical video conferencing user-interface including a live image from the webcam of the photography station and a smaller live feed of the photographer.

The live communication feed window 702 is a user interface that allows the photographer P to send instruction messages to the computing device 142 at the photography station 504. When an instruction message is received at the photography station 504 the computing device will communicate an instruction to the subject S. In some examples the instruction message contains an audible instruction and when the received at the computing device 142 it causes the computing device 142 to play the audible instruction. In other examples the instruction message contains a visual instruction and causes the computing device 142 to display the visual instruction.

The example user-interface 485 includes a photography camera feed window 704. The window 704 can include a live image from the camera 102, as shown in the example of FIG. 13. The image displayed in the window 704 provides the photographer P with the feed of what a photograph will look like once it is captured. In the typical embodiment the photography camera feed window 704 will display a live feed capturing the subject. In some examples the photography camera feed window 704 includes posing lines to help guide the photographer pose a subject. In one example, the photography camera feed window 704 has visual instructions which assist the photographer in completing the photography session.

The example user-interface 485 includes a session status report window 706. The session status report window 706 display information related to the photography session. Including a photo item number, a photo criteria, a preview of the image, an image ID and a rank. The session status report window includes a wide variety of user-interfaces which display's general and specific information related to a photography session. Examples of photography session user-interfaces are illustrated and described in more detail in reference to FIGS. 5-8.

The user-interface 485 can include various customizations and navigation options. In the example of FIG. 19 the user-interface includes a window navigation tab 708. A user can select the tab and navigate which window is displayed in the related window. Many other view navigations are possible including bottom bar tabs, top tab menu, list menus, gesture-based navigation, and any other user-interface system which allows a user to modify one or more windows displayed.

FIG. 20. is an example user-interface 485 for a remote photographer. In the example shown, the user-interface 485 includes a live communication feed window 702, a photography camera feed window 704, a camera adjustment window 710. The example shown also includes a window navigation tab 708 in the session status report window 706, which allows the user to navigate to the camera adjustments window. The camera adjustment window 710 can includes a zoom controller 712, a focus controller 714, an orientation controller 716, and position controller 718.

The live communication feed window 702 and photography camera feed window 704. Are the same live communication feed window 702 and photography camera feed window 704, as described in detail in reference to FIG. 19.

The example user-interface 485 includes a camera adjustment window 710. The camera adjustment window 710 provides a user-interface which allows the photographer to control the camera 102 (as shown in the example of FIG. 13). The camera adjustment window 710 can includes a zoom controller 712, a focus controller 714, an orientation controller 716, and position controller 718. The camera adjustment window can also include a capture initiator 720.

The camera adjustment window 710 receives inputs from the Photographer P which generate at least one message which is sent to the photography station. Examples of messages sent in response to user input using the camera adjustment window 710 include control messages which are sent to the computing device 142 at the photography station which cause the computing device 142 to instruct the camera 102 or the camera adjuster 524 to take an action. Examples of control messages include capture messages which are sent to the computing device 142 which in turn instructs the camera 102 to capture a photograph. Another example of a control message is an adjustment message. An adjustment message can cause the computing device 142 to make a mechanical or digital adjustment to the camera 102, or the camera adjuster 524.

The zoom controller 712 is used to modify the zoom of the camera 102. In some examples the zoom controller is used to send at least one adjustment message to the camera 102, or the camera adjuster 510, which adjust the optical zoom of the camera. The adjustment message can also modify the digital zooms settings. In some embodiments, the zoom controller 712 can adjust both optical and digital zoom, and the zoom controller 712 includes a sub controller of optical zoom and another for digital zoom.

The focus controller 714 is used to remotely adjust the focus of the camera 102. In some examples the focus controller 714 may include an auto-focus option as well as a user-operated control. The Focus controller 714 can receive inputs which are sent to the camera adjuster 510 or the camera 102, to modify focus of the camera 102. In some examples, the focus controller is automatic, or the controller includes both automatic and manual option.

The orientation controller 716 controls the orientation of the camera. The orientation controller 716 can modify the angle of the camera 102. For example, the orientation controller can move the position of the camera upwards, downwards, right, and left. The orientation controller 716 can also rotate the camera 102. For example, the photographer may notice that the camera is not level and can send an adjustment message to the orientation controller 716 which with the camera adjuster can rotate the camera to a level position.

The position controller 718 controls the position of the camera. For example, the photographer can move the camera assembly 524 to different locations in the photography station to take images from different locations. In some examples, the position controller 718 can also move the camera up and down, using the camera assembly 524.

The capture initiator 720 when selected by the photographer P sends a capture message to the camera 102 which causes the camera 102 to capture an image. In some examples, the capture initiator 720 sends one or more messages to the camera through the camera adjuster 510 or the lighting controller 144. In some examples the capture initiator starts a countdown which is visible to one of or both the photographer P and a subject S at the photography station. The countdown gives an indication of when the photograph will be taken to ensure the photographer P and the subject S are prepared for the capture to be initiated. In some examples the capture initiator 720 is automatic. For example, the system may detect when the subject is in certain pose, or a certain facial expression, and automatically capture the image. In some examples, the system may automatically capture a photography after the system detects that the photograph meets all of the requirement criteria for one or more photography's in a photography session. In such examples, the system may automatically update a portrait order specification for the photography session.

More control options are possible in the camera adjustment window 710 including, shutter control and panning.

The user-interface 485 can include various customizations and navigation options. In the example of FIG. 20 the user-interface includes a window navigation tab 708. A user can select the tab and navigate which window is displayed in the related window. Shown in FIG. 20 the adjustment window is selected. Many other view navigations are possible including bottom bar tabs, top tab menu, list menus, gesture-based navigation, and any other user-interface system which allows a user to modify one or more windows displayed.

FIG. 21 is an example user-interface 487 for a photography station. The user-interface includes a live communication feed window 722, a photography camera feed window 724, and an image reviewer window 726.

The example user-interface 487 includes a live communication feed window 722. The live communication feed window 722, in some examples, is a typical video conferencing user-interface. In the example shown the communication feed includes a live video of the photographer P in a large screen and the subject S, who can view the window 722, in a smaller window. Many other communication feed windows 722 are included in this disclosure including live audio only feeds, and live video feeds with virtual or augmented reality.

The example user-interface 487 includes a photography camera feed window 724. The window 724 can include a live image from the camera 102, as shown in the example of FIG. 13. The image displayed in the window 724 provides the subject S with the feed of what a photograph will look like once it is captured. In the typical embodiment the photography camera feed window 724 will display a live feed capturing the subject.

The example user-interface 487 includes an image reviewer window 726. The image reviewer window 726 displays a UI which allows the subject to review the photography session. In the example shown, the window 724 displays a grid with the photos taken during the session.

Figure 22:
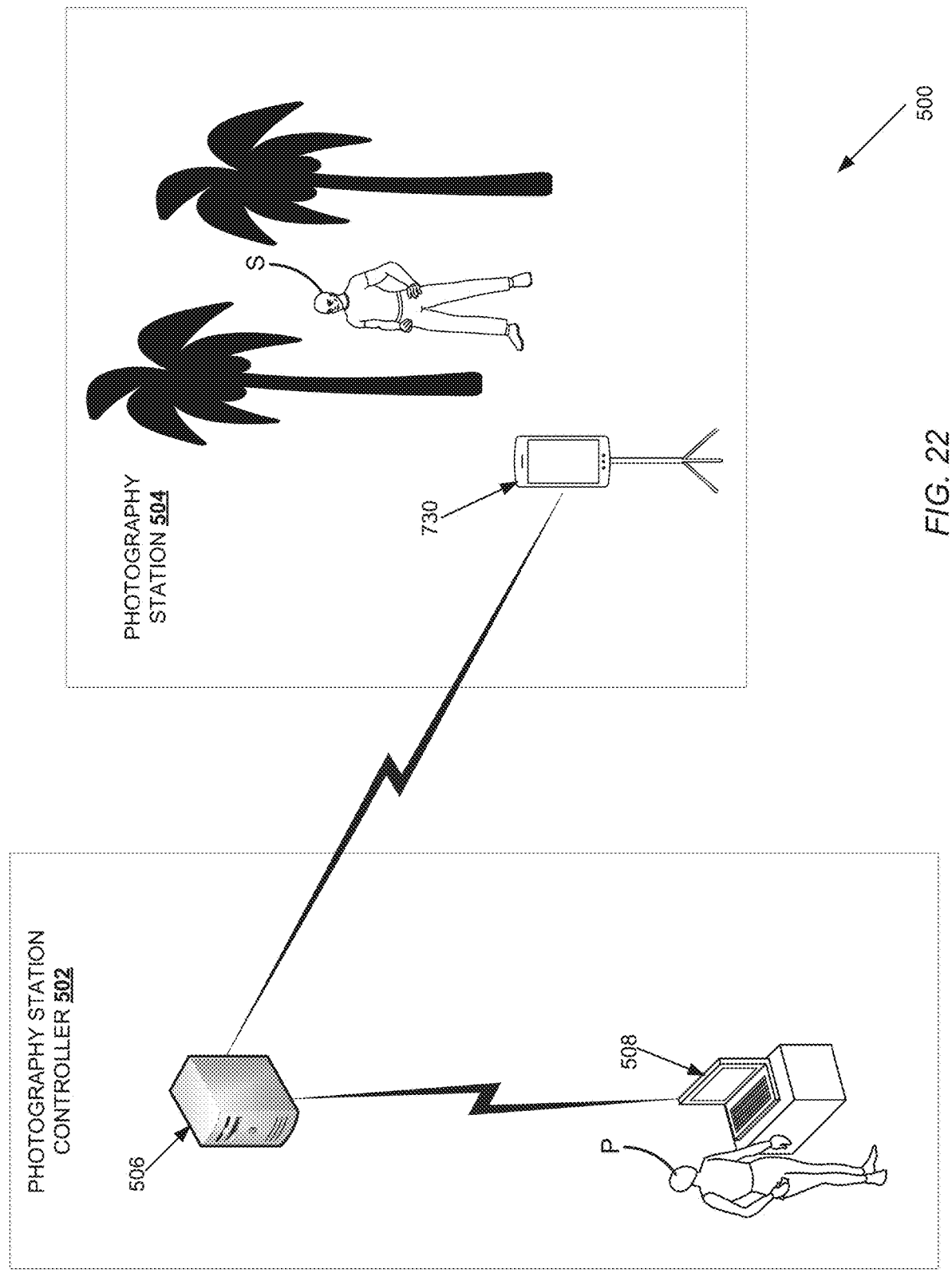
FIG. 22 is a schematic diagram illustrating an example remote photography system.

FIG. 22 is a schematic diagram illustrating an example remote photography system 500. The example shown includes a photography station controller 502 and the photography station 504. The photography station controller 502 includes a photography station controller web service 506 and a photographer computing device 508. The photography station 504 includes a mobile computing device 730.

The photography station controller 502 includes a photography station controller web service 506, and a photographer computing device 508. The controller 502, web service 506, and computing device 508, operate in a similar manner as illustrated and described in reference to FIG. 13.

The photography station controller includes a mobile computing device 730. In some embodiments of the present disclosure the photography station is set-up by the subject S using a mobile computing device 730. The mobile computing device 730 includes any of a variety of mobile computing devices which include a camera. For example, the mobile computing device can be a smart phone, a tablet, or a laptop. In some examples, the mobile computing device must be able to connect to a network to communicate with the photography station controller. The device 730 receives instructions from the photographer P and messages initiate the capture of one or more photographs of the subject S.

Figure 23:
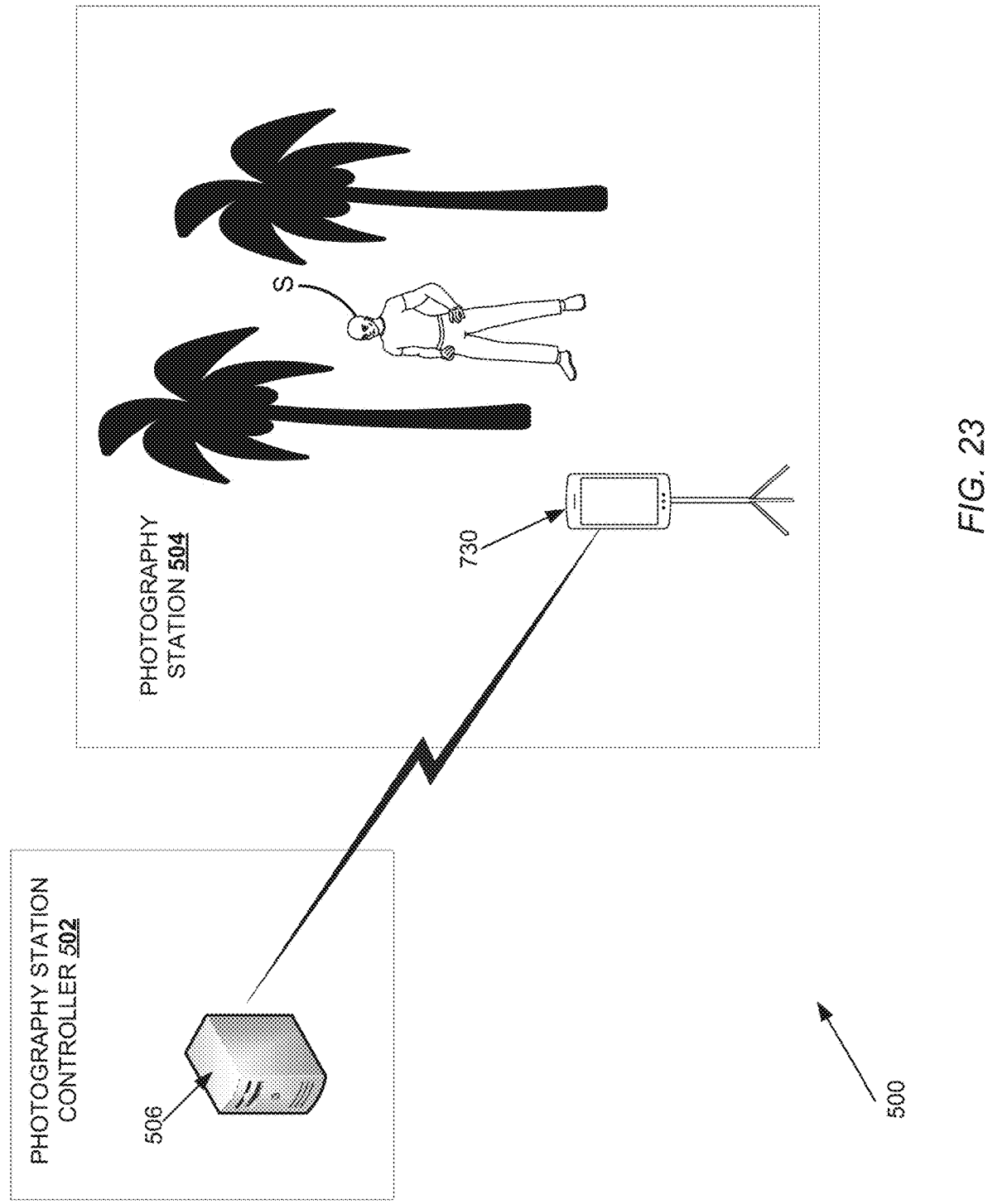
FIG. 23 is a schematic diagram illustrating an example remote photography system.

FIG. 23 is a schematic diagram illustrating an example remote photography system 500. The example shown includes a photography station controller 502, and a photography station 504. The photography station controller 502 includes a photography station controller web service 506. The photography station 504 includes a mobile device 730.

In the example shown the photography station controller 502 includes a photography station controller web service 506. The photography station controller web service 506 receives live images from the mobile computing device 730. The photography station controller web service 506 can then detect certain features in the live image and generate instructions which can be sent to the mobile computing device 730. In some examples, the instructions are audible. The instructions can also be visual, in some examples. The photography station controller web service 506 can also generate a message which initiates the mobile computing device 730 to capture one or more photos of the subject S. The photography station controller web service 506 may include artificial intelligence, machine learning, neural networks, or a variety of image processing methods to detect features of an image, provide instructions and capture images according to a criteria for a photography session.

In the example shown the photography station 504 includes a mobile computing device 730 which is connected to the photography station controller 502 remotely through a network. In some examples, the mobile computing device 730 connects to a wireless network such as 4G, 5G, and WIFI. The device 730 operates similar to the example of FIG. 22. The device 730 receives one or more instruction messages from the photography station controller web service 506 which can played audibly to the subject S. The device 730 also receives a capture message to initiate capturing one or more photographs.

The photography station 504 includes a mobile computing device and operates similar to the example of FIG. 22. In this example, the mobile computing device receives instructions and messages to capture a photography from the photography station controller web service 506. In this manner the subject S initiates a photography session with the mobile computing device 730.

Figure 24:
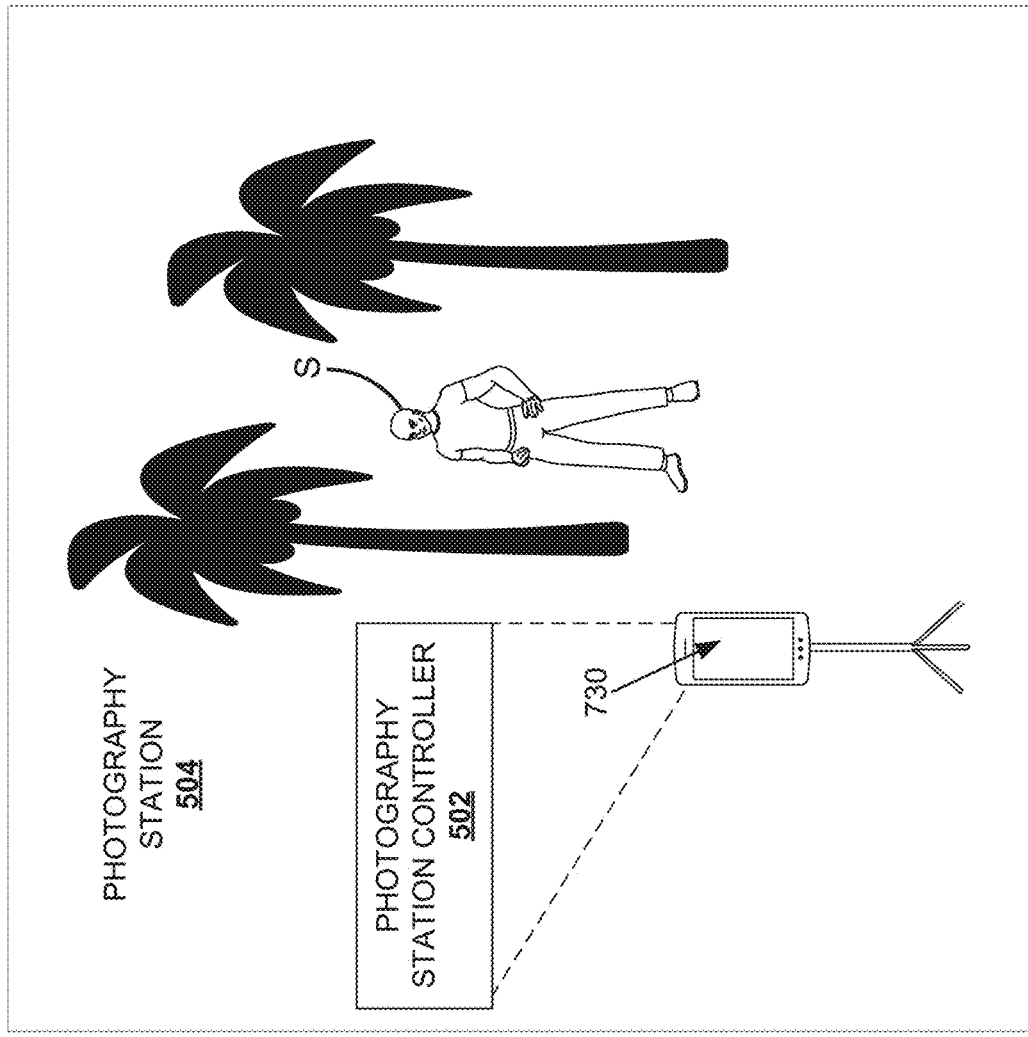
FIG. 24 is a schematic diagram illustrating an example remote photography system.

FIG. 24 is a schematic diagram illustrating an example remote photography system 500. The system 500 includes a photography station 504. The photography station includes a mobile device 730 with a photography station controller 502.

The photography station 504 includes a mobile computing device and operates similar to the example of FIG. 23. In this example, the mobile computing device contains a photography station controller 502 which when executed by the mobile computing device instruct the subject S and captures one or more photographs for a photography session. In some examples the mobile computing device 730 does not need to connect to a network because the photography station controller 502 runs the photography station controller natively. The photography station controller 502 may include artificial intelligence, machine learning, neural networks, or a variety of image processing methods to detect features of an image, provide instructions and capture images according to a criteria for a photography session.

Figure 25:
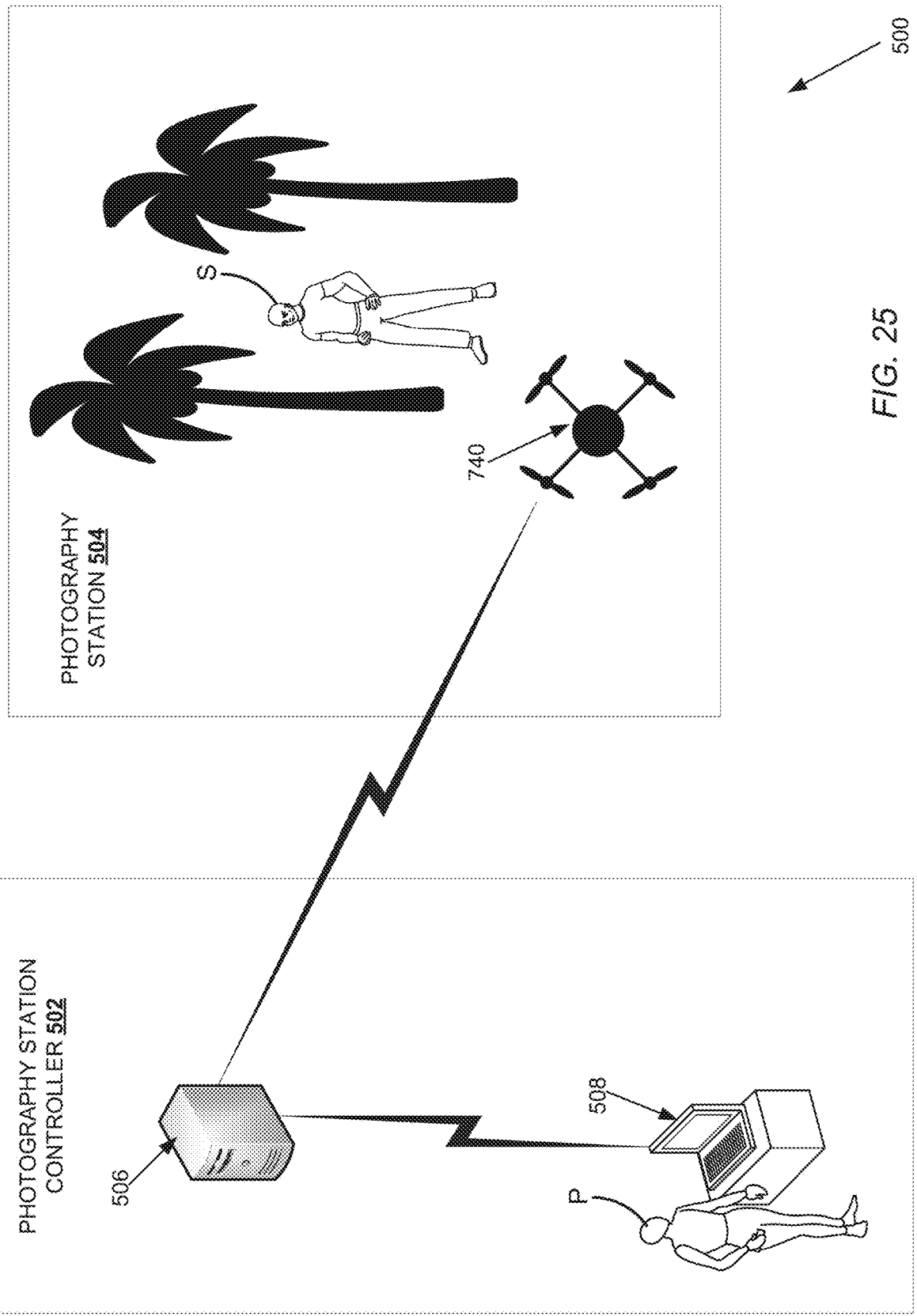
FIG. 25 is a schematic diagram illustrating an example remote photography system.

FIG. 25 is a schematic diagram illustrating an example remote photography system 500. The system 500 includes a photography station controller 502 and a photography station 504. The photography station controller 502 includes a photography station controller web service 506 and a photographer computing device 508. The photography station 504 includes a drone photography device 740.

The photography station controller 502 includes a photography station controller web service 506, and a photographer computing device 508. The controller 502, web service 506, and computing device 508, operate in a similar manner as illustrated and described in reference to FIG. 13. In this example the photographer P controls the drone remotely to capture one or more photographs of the subject S. The photographer P can capture a set of photographs to conduct a photography session.

The photography station 504 includes a drone photography device 740. The drone photography device 740 can include a wide variety of remote-controlled devices with a camera. The device 740 is controlled by the photographer P who can move around the device 740 to capture one or more photographs for a photography session. In some examples, the drone photography device 740 can operate in many ways similar to the camera 102 or the camera assembly as illustrated and described in FIGS. 13-14.

Figure 26:
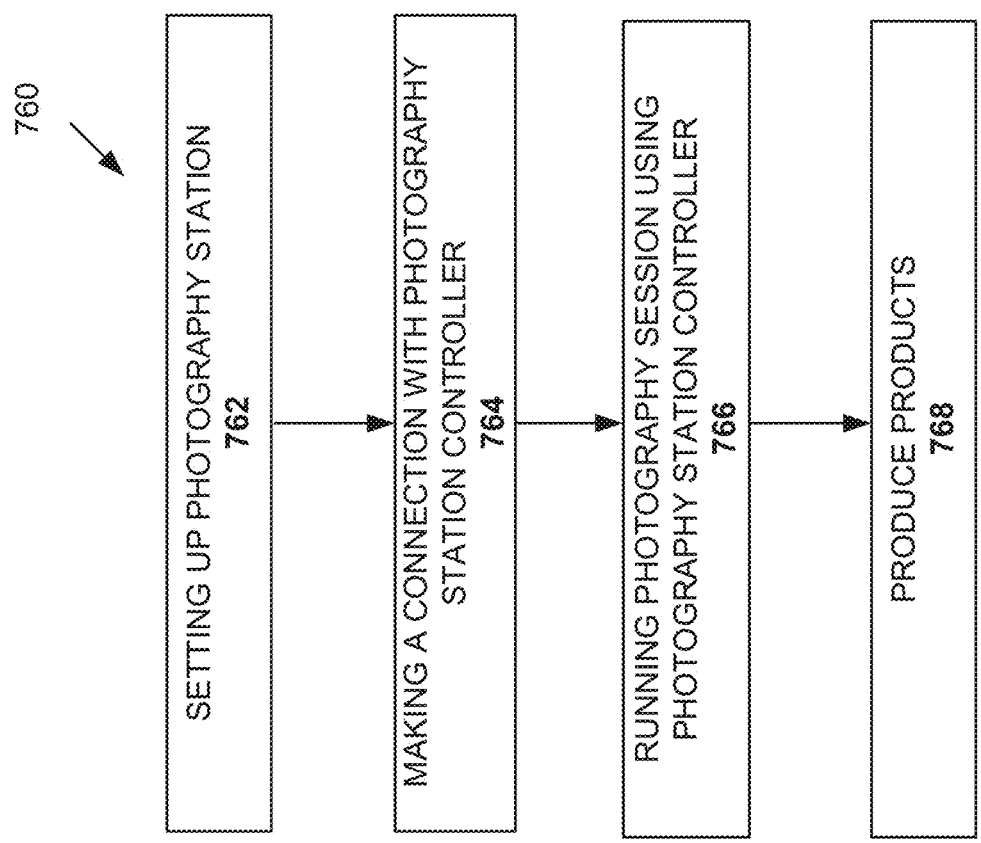
FIG. 26 is a flow chart illustrating an example method of conducting a remote photography session.

FIG. 26 is a flow chart illustrating an example method 760 of conducting a remote photography session. The method 760 can include operations 762, 764, 766, and 768.

The operation 762 the photography station is set up. In some examples setting up the photography station includes the photographer, or a coworker going to the station setting up the station with the components that are illustrated and described in FIG. 13. In other examples the subject S can set up the photography station. Other examples of photography station set ups are illustrated and described in reference to FIGS. 22-25.

The operation 764 a connecting between the photography station and the photography station controller is made. In some examples the connecting is made over a public network, such as the Internet, between a computing device 142 and photographer computing device 508. The connect allows for the remote instruction and capture of photographs from the photography station controller 502. In some examples the connection is with a remote photographer. In other examples, the connection is with a set of algorithms executed as part of a remote photography application.

The operation 766 a photography session is run with a remote photographer using the photography station controller. Running a photography session includes giving instructions to help the subject pose to meet certain criteria and initiate the capture of one or more photographs. More details of running a photography session are discussed herein. An example method for the operation 766 is illustrated and described in reference to FIG. 27.

The operation 768 products from the photography session are produced. Products include picture products, clothing products, and many other commercial products which allows for the placement of an image captured during the photography session.

Figure 27:
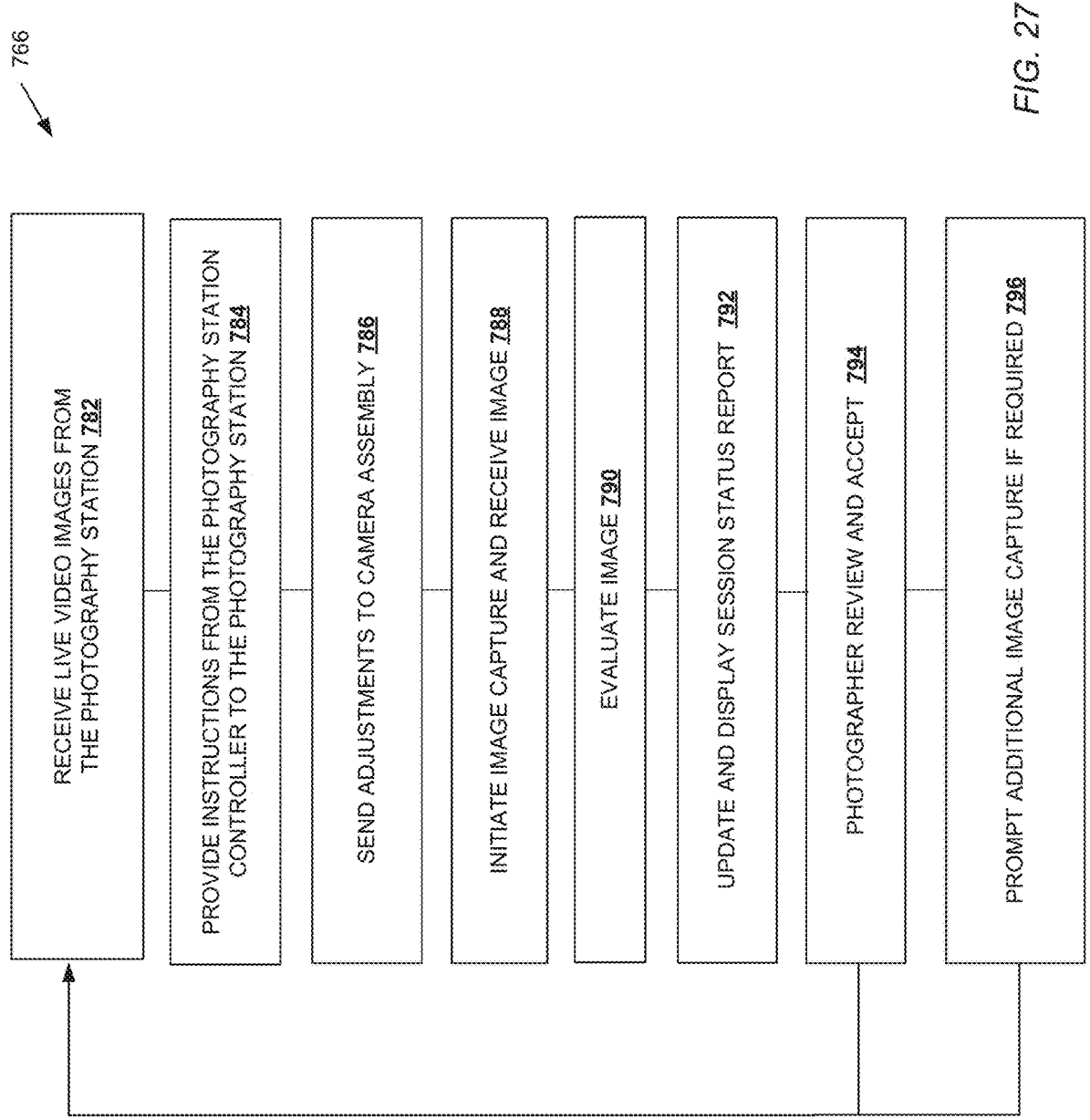
FIG. 27 is a flow chart illustrating an example method of running a photography session using a photography station controller.

FIG. 27 is a flow chart illustrating an example method 766 of running a photography session using the photography station controller. In some embodiments the method 766 is an example method of the operation 766 illustrated and described in reference to FIG. 26. The method 766 includes the operations 782, 784, 786, 788, 790, 792, 794, and 796.

The operation 782 a live video image is sent from the photography station to the remote photography station controller where the live images are reviewed by a photographer. In some examples the live images are sent over a video conferencing application. In other examples, the live images are captured by a camera which is used to take the product photograph at the photography station.

The operation 784 the photographer provides instructions to the photography station. This can include instructions for a subject to give a certain pose ore move positions. The instructions can include any of a variety of instructions to adjust a scene or a subject captured by a camera in the photography station.

Some examples the photographer can provide instructions to one or more subjects to position the one or more subjects. Similarly, the photographer can provide instructions to integrate props into a photograph. The photographer can provide verbal commands for subjects, and cues, including tones and other similar audio sounds, to notify the subject to take action or prepare for an image to be captured.

In other examples the photographer receives instructions or cues to assist with the photography session. In one example the photographer can receive a cue when determination is made that the photography parameters are within the performance window to prompt the remote photographer to capture the image. A different cue can be provided to the remote photographer when deviating from the photography session parameters. In another example the photographer can receive a cue when a determination is made that a captured image is of acceptable quality and meets criteria (for example, pose, crop, facial expression) of a required photograph for the session to prompt the remote photographer to move onto capturing another required photograph (for example, by providing new instructions over the channel to change a pose, facial expression, etc.).

The operation 786 adjustments are sent from the photography station controller to a camera assembly. These adjustments include adjusting the camera settings, focus, zoom, and the cameras position either by location or orientation.

Some examples of adjustments which can be sent to the photography station include adjusting the illumination or the subjects and the background, adjusting position and orientation of the camera to capture an image, and adjust lens to minimize distortions. Other examples of adjustments include controlling mechanical operations of the image capture device. For example, sending signals over communication channel to cause the image capture device to move/re-position, focus, zoom, or capture an image.

The operation 788 the photographer at the photography station controller initiates an image capture which is delivered over a network to the camera at the photography station and captures an image. The captured image is then sent back over the network to the photography station controller.

The operation 790 the photographer evaluates the image. In some examples if the photographer is not satisfied with the image the operations 784, 786, 788, and 790 can be repeated until an image is captured which satisfies the photographer's requirements. In some examples the operation 790 includes the operations 408, 410, 412, and 414 illustrated and described in reference to FIG. 10.

The operation 792 the session status report is updated and displayed for the photographer. Examples of a session status report are illustrated and described in reference to FIGS. 6-7.

The operation 794 the photographer reviews the status report and accepts the image or rejects the image. If the photographer rejects the image the operations 782-794 are repeated until an image which is acceptable is produced.

The operation 796 the photographer will be prompted to capture additional images if required for the photography session. In some examples different photographs meeting different requirements are part of a session. Accordingly, the operations 782-794 are repeated to complete the session.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of instructing and capturing at least one photograph during a remote photography session at a photography station, the method comprising:
   establishing a communication channel with a computing device of a remote photography station, wherein the remote photography station further includes a digital camera, with a lens and an electronic image sensor, configured to convert received light into digital image data;
   receiving live images of the remote photography station from the computing device;
   evaluating the live images based on at least one required criteria of a required photograph for the remote photography session; and
   generating and sending at least one message to the computing device over the communication channel instructing the computing device to capture an optical image according to the at least one required criteria using the digital camera, wherein the at least one message includes an instruction based at least in part on the at least one required criteria of the required photograph for the remote photography session.

2. The method of claim 1, wherein generating and sending the at least one message to the computing device further instructs the computing device to make an adjustment of the digital camera.

3. The method of claim 2, wherein the adjustment of the digital camera further includes adjustment of:
   a digital camera position setting.

4. The method of claim 1, wherein generating and sending the at least one message to the computing device further instructs the computing device to output audio presenting the instruction.

5. The method of claim 1, wherein the method is performed using a software application simulating a photographer, the software application generating the instruction.

6. The method of claim 1, wherein generating and sending the at least one message to the computing device further instructs the computing device to present the instruction visually on a display.

7. The method of claim 1, the method further comprising:
   establishing a video conferencing session with the computing device of the remote photography station.

8. The method of claim 1, wherein evaluating the live images based on the at least one required criteria includes detecting at least one feature in the live images and associating the at least one feature with the at least one required criteria.

9. A system for capturing at least one photograph during a remote photography session, the system comprising:
   a photography station controller including a first computing device; and
   a photography station remote from the photography station controller, the photography station including:
      a second computing device; and
      a digital camera, with a lens and an electronic image sensor, configured to convert received light into digital image data;
   wherein the first computing device includes a non-transitory storage medium and at least one processor, the non-transitory storage medium storing instructions that, when executed by the at least one processor, cause the first computing device to:
establish a communication channel with the second computing device;
receive live images from the second computing device over the communication channel;
evaluate the live images based on at least one criteria of a required photograph for the remote photography session; and
generate and send at least one message to the second computing device over the communication channel to instruct the second computing device to capture an optical image according to the at least one criteria using the digital camera, wherein the at least one message includes an instruction based at least in part on the at least one criteria of the required photograph for the photography session.

10. The system of claim 9, wherein the at least one message sent to the second computing device further instructs the second computing device to make an adjustment of the digital camera.

11. The system of claim 10, wherein the adjustment of the digital camera further includes adjustment of at least one of:
(1) a focus setting;
(2) a zoom setting; and
(3) a digital camera position setting.

12. The system of claim 9, wherein the at least one message sent to the second computing device further instructs the second computing device to output audio to present the instruction.

13. The system of claim 9, wherein the at least one message sent to the second computing device further instructs the second computing device to present the instruction visually on a display.

14. The system of claim 9, the system further comprising:
a first webcam, a first microphone, and a first speaker each in data communication with the first computing device;
a second webcam, a second microphone, and a second speaker each in data communication with the second computing device; and
wherein the instructions when executed by the at least one processor further cause the first computing device to:
establish a video conferencing session with the second computing device of the remote photography station.

15. A non-transitory computer readable storage medium storing instructions for remotely conducting a photography session at a photography station, wherein when the instructions are executed by a processor, the instructions cause the processor to:
establish a communication channel with a computing device of the remote photography station, wherein the remote photography station includes a digital camera, with a lens and an electronic image sensor, configured to convert received light into digital image data;
receive live images of the remote photography station over the communication channel;
evaluate the live images based on at least one criteria of a required photograph for the photography session; and
generate and send at least one message to the computing device over the communication channel to instruct the computing device to capture an optical image according to the at least one criteria using the digital camera, wherein the at least one message includes an instruction based at least in part on the at least one required criteria of the required photograph for the photography session.

16. The non-transitory computer readable storage medium of claim 15, wherein the at least one message sent to the computing device further instructs the computing device to make an adjustment of the digital camera.

17. The non-transitory computer readable storage medium of claim 16, wherein the adjustment of the digital camera further includes adjustment of at least one of:
(1) a focus setting;
(2) a zoom setting; and
(3) a digital camera position setting.

18. The non-transitory computer readable storage medium of claim 15, wherein the at least one message sent to the computing device further instructs the computing device to output audio to present the instruction.

19. The non-transitory computer readable storage medium of claim 15, wherein the at least one message sent to the computing device further instructs the computing device to present the instructions visually on a display.

20. The non-transitory computer readable storage medium of claim 15, wherein the instructions when executed by the processor further cause the processor to:
establish a video conferencing session with the computing device of the remote photography station.

* * * * *